(12) United States Patent
Thibeault et al.

(10) Patent No.: US 6,278,909 B1
(45) Date of Patent: Aug. 21, 2001

(54) METHOD AND APPARATUS FOR CONTROLLING THE AMOUNT OF POWER SUPPLIED TO A CONDITIONING DEVICE

(75) Inventors: Pierre Thibeault, Montreal; Roland Couture, Quebec City; Louis Handfield, Longueuil, all of (CA)

(73) Assignee: Hydro-Quebec, Montreal (CA)

( * ) Notice: Subject to any disclaimer, the term of this patent is extended or adjusted under 35 U.S.C. 154(b) by 0 days.

(21) Appl. No.: 09/161,706

(22) Filed: Sep. 29, 1998

(51) Int. Cl.$^7$ .................................................. G05D 23/00
(52) U.S. Cl. ..................... 700/286; 700/276; 700/291; 700/296; 700/299
(58) Field of Search .................................... 700/275, 276, 700/277, 278, 286, 306, 33–35, 44, 45, 46, 14, 291, 292, 295, 296, 299, 300, 47; 219/492, 497, 498; 236/46 R, 46 F, 47; 165/239, 158, 267–269; 62/158

(56) References Cited

U.S. PATENT DOCUMENTS

| 4,100,428 | 7/1978 | Delisle et al. ........................ 307/97 |
| 4,167,965 | 9/1979 | Rogers ................................... 165/1 |
| 4,228,511 | 10/1980 | Simcoe et al. ....................... 364/506 |
| 4,292,813 | * 10/1981 | Paddock ................................. 62/158 |
| 4,449,178 | * 5/1984 | Blau, Jr. et al. ....................... 700/47 |
| 4,509,585 | 4/1985 | Carney et al. ......................... 165/12 |
| 4,909,041 | 3/1990 | Jones ....................................... 62/99 |
| 5,095,715 | 3/1992 | Dudley ................................. 62/228.4 |
| 5,285,963 | 2/1994 | Wakefield et al. ................... 237/2 A |
| 5,361,982 | 11/1994 | Liebl et al. .......................... 236/46 R |
| 5,467,812 | 11/1995 | Dean et al. ............................... 165/2 |
| 5,501,268 | 3/1996 | Stovall et al. ........................... 165/1 |
| 5,678,626 | 10/1997 | Gilles ..................................... 165/62 |
| 5,682,949 | 11/1997 | Ratcliffe et al. ..................... 165/209 |
| 5,703,342 | * 12/1997 | Hoffmann et al. ................... 219/497 |

* cited by examiner

*Primary Examiner*—Paul P. Gordon
*Assistant Examiner*—Steven R. Garland
(74) *Attorney, Agent, or Firm*—Foley & Lardner

(57) ABSTRACT

The method and apparatus are for controlling an amount of power supplied to a conditioning device acting on an actual value of a predetermined physical parameter within an area in relation to a setting signal. The method comprising steps of monitoring the setting signal to detect a change thereof, and when a changed setting signal is detected (i) determining a time period and a uniform amount of power required by the conditioning device to cause the actual value of the predetermined physical parameter to theoretically reach a new range of desired values corresponding to the changed setting signal, and (ii) establishing time-related upper and lower limit profiles HLV(t) and LLV(t) of the predetermined physical parameter for the time period determined in step (i). When the actual value of the predetermined physical parameter reaches one of the limit profiles HLV(t) and LLV(t), controlling the amount of power supplied to the conditioning device to cause the actual value of the predetermined physical parameter to follow substantially the limit profile HLV(t) or LLV(t) that has been reached for a remaining portion of the time period.

18 Claims, 20 Drawing Sheets

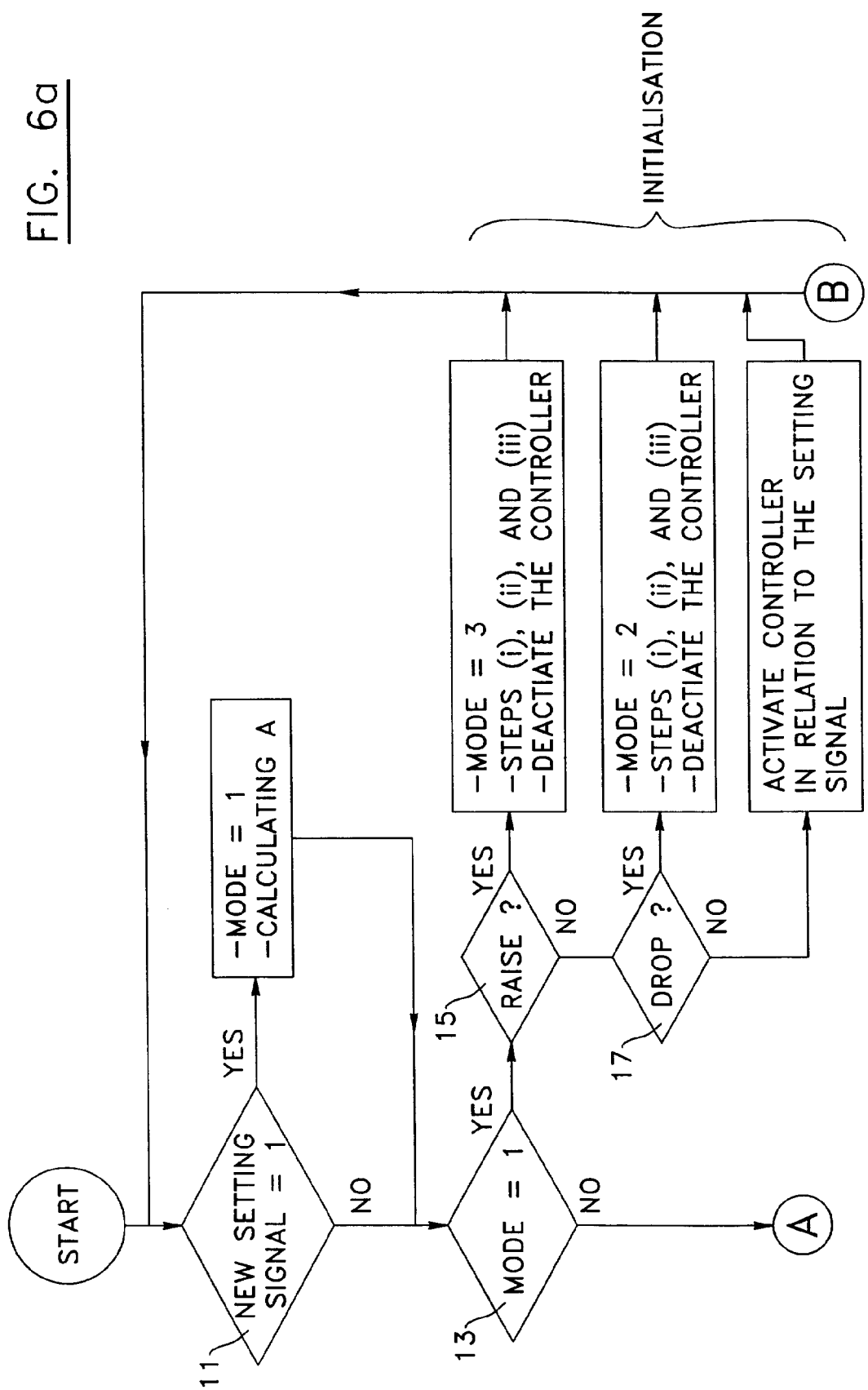

METHOD AND APPARATUS FOR CONTROLLING THE AMOUNT OF POWER SUPPLIED TO A CONDITIONING DEVICE

FIELD OF THE INVENTION

The present invention is concerned with a method and an apparatus for controlling the amount of power supplied to a conditioning device such as, for example, a heating device acting on the value of a predetermined physical parameter within an area in relation to a setting signal. In the following description, reference will be made to temperature control but the present invention may be also applied to the control of humidity, pressure, or any other physical parameter.

BACKGROUND OF THE INVENTION

Changes in temperature in a house or building tend to be required at specific periods of the day. For example, in a cold environment, the temperature setting is lower for the night and higher at wake-up time. This produces an instant high electrical power demand coming from a multitude of houses around the same time, which results in problems for electricity supply companies.

Known in the art, there is the U.S. Pat. No. 4,228,511 of SIMCOE et al., describing a system and a method for limiting power demand and for temperature control. According to this invention, a room thermostatic control provides for automatic power defer, i.e. modification of load consumption of electrically energized heating and cooling systems during intervals when there is a peak load demand on the electrical supply system. During power defer ambient indoor temperature is controlled by set point adjustment to minimize discomfort, e.g. by pre-boosting, by ramped temperature deferral at controlled rates, and thereafter by ramped recovery at controlled rates to the reference, i.e. desired, temperature. A circuit sensing external conditions, e.g. outdoor temperature, indicative of power defer, is utilized to generate a power defer signal for enabling modification of the set point. Digital signals are stored for each of a plurality of consecutive real time intervals for heating and cooling modes. A real time clock is utilized to access the digital signals for the current time interval. During presence of a power defer signal set point variation is controlled in accordance to the relevant digital signals for each current time interval.

The following patents also describe different systems or methods for power demand control or temperature control: U.S. Pat. Nos. 4,100,428; 4,167,965; 4,228,511; 4,509,585; 4,909,041; 5,095,715; 5,285,963; 5,361,982; 5,501,268; 5,467,812; 5,678,626 and 5,682,949.

A drawback with the systems or methods of the prior art is that although some of them allow a deferring of the power demand when a peak load occurs, none of them is concerned with a method or a system for spreading over a time period and reducing in intensity the amount of power supplied to a conditioning device when a new setting signal is issued.

An object of the present invention is to provide a method and an apparatus for spreading over a time period and reducing in intensity the amount of power supplied to a conditioning device when a new setting signal is issued.

Another object of the present invention is to perform the above-mentioned spreading over a time period and reducing in intensity in a way where the discomfort for the user is controlled and limited.

SUMMARY OF THE INVENTION

According to the present invention, there is provided a method for controlling an amount of power supplied to a conditioning device acting on an actual value of a predetermined physical parameter within an area in relation to a setting signal, the method comprising steps of:

(a) monitoring the setting signal to detect a change thereof;

(b) if the monitoring of step (a) fails to detect the change of the setting signal, controlling the amount of power supplied to the conditioning device to maintain the actual value of the predetermined physical parameter within a range of desired values determined by the setting signal, and returning to step (a); and (c) if the monitoring of step (a) detects a changed setting signal:

(i) determining a time period and a uniform amount of power required by the conditioning device to cause the actual value of the predetermined physical parameter to theoretically reach a new range of desired values corresponding to the changed setting signal;

(ii) establishing time-related upper and lower limit profiles HLV(t) and LLV(t) of the predetermined physical parameter for the time period determined in step (i), the upper and lower limit profiles HLV(t) and LLV(t) having respectively different starting values and converging toward the new range of desired values at an end of the time period, the actual value of the predetermined physical parameter being included in a range delimited by the starting values;

(iii) supplying the uniform amount of power determined in step (i) to the conditioning device;

(iv) monitoring the actual value of the predetermined physical parameter during the time period in view of the upper and lower limit profiles HLV(t) and LLV(t) to detect when the actual value of the predetermined physical parameter reaches one of the limit profiles HLV(t) and LLV(t);

(v) when the actual value of the predetermined physical parameter reaches one of the limit profiles HLV(t) and LLV(t), controlling the amount of power supplied to the conditioning device to cause the actual value of the predetermined physical parameter to follow substantially the limit profile HLV(t) or LLV(t) that has been reached for a remaining portion of the time period; and (vi) monitoring time from a beginning of the time period and when the time period ends returning to step (a).

Preferably, the range of desired values is limited to a single desired value, the amount of power supplied to the conditioning device is limited to a maximum power amount, and, in step (i), the uniform amount of power is determined by steps of:

calculating a value A where A=(the single desired value−the actual value);

measuring an actual amount of power supplied to the conditioning device, and calculating a first percentage of the maximum power amount that represents the actual amount; and calculating a second percentage of the maximum power amount where the second percentage=(the first percentage+(A*a power command error)), the uniform amount of power being determined as the second percentage of the maximum power.

Preferably, in step (ii), the time-related upper and lower limit profiles HLV(t) and LLV(t) are established by steps of:

determining whether the value A is positive or negative;

if the value A is positive, which means that the actual value of the predetermined physical parameter has to be raised, establishing:

the lower limit profile LLV(t) of step (ii) by means of the following equation: LLV(t)=the single desired value−((the time period−Δt)*(A+a predetermined tolerance margin)/the time period), Δt representing time elapsed since the beginning of the time period; and the upper limit profile HLV(t) of step (ii) by means of the following equation: HLV(t)=the single desired value; and if the value A is negative, which means that the actual value of the predetermined physical parameter has to be lowered, establishing:

the upper limit profile HLV(t) of step (ii) by means of the following equation: HLV(t)=the single desired value−((the time period−Δt)*(A−a predetermined tolerance margin)/the time period); and the lower limit profile LLV(t) of step (ii) by means of the following equation: LLV(t)=the single desired value.

Preferably, in step (i), when a first changed setting signal is detected, the time period is determined in relation to a predetermined initialization value, and for each subsequent changed setting signal that is detected, the time period is upgraded by means of the following steps:

calculating the following equation:
the time period=a precedent time period+a gain*(a previous amount of power determined in step (i)−a predetermined fraction of the maximum power amount), where the gain and the predetermined fraction are fixed values determined by previous experimentations; and comparing the time period with a range of acceptable time periods, if the time period is within the range of acceptable time periods then the time period is used, otherwise the time period is set to a closest value within the range of acceptable time periods.

Preferably, the steps (iii), (iv), (v) and (vi) are deferred at a time T1 to obtain the new range of desired values at a predetermined time T2, T1 being equal to T2 minus the time period; and the controlling of the step (b) is performed as long as steps (iii), (iv), (v) and (vi) are deferred.

According to the present invention, there is also provided an apparatus for controlling an amount of power supplied to an conditioning device acting on an actual value of a predetermined physical parameter within an area in relation to a setting signal, the apparatus comprising:

first monitoring means for monitoring the setting signal to detect a change thereof;

first controlling means for controlling the amount of power supplied to the conditioning device as long as the first monitoring means fails to detect the change of the setting signal, the first controlling means controlling then the amount of power to maintain the actual value of the predetermined physical parameter within a range of desired values determined by the setting signal; and second controlling means for controlling the amount of power supplied to the conditioning device when the first monitoring means detects a changed setting signal, the second controlling means comprising:

first estimating means for estimating a time period and a uniform amount of power required by the conditioning device to cause the actual value of the predetermined physical parameter to theoretically reach a new range of desired values corresponding to the changed setting signal;

second estimating means for estimating time-related upper and lower limit profiles HLV(t) and LLV(t) of the predetermined physical parameter for the time period estimated by the first estimating means, the upper and lower limit profiles HLV(t) and LLV(t) having respectively different starting values and converging toward the new range of desired values at an end of the time period, the actual value of the predetermined physical parameter being included in a range delimited by the starting values;

supplying means for supplying the uniform amount of power determined by the first estimating means to the conditioning device;

second monitoring means for monitoring the actual value of the predetermined physical parameter during the time period in view of the upper and lower limit profiles HLV(t) and LLV(t) to detect when the actual value of the predetermined physical parameter reaches one of the limit profiles HLV(t) and LLV(t);

third controlling means for controlling the amount of power supplied to the conditioning device when the actual value of the predetermined physical parameter reaches one of the limit profiles HLV(t) and LLV(t), to cause the actual value of the predetermined physical parameter to follow substantially the limit profile HLV(t) or LLV(t) that has been reached for a remaining portion of the time period; and third monitoring means for monitoring time from a beginning of the time period and, when the time period ends, returning the control of the amount of power supplied to the conditioning device to the first controlling means.

Preferably, the apparatus further comprising a third estimating means for estimating a power command error of the uniform amount of power estimated by the first estimating means by integrating, over the remaining portion of the time period, a difference between the amount of power supplied to the conditioning device during said remaining portion of the time period and the uniform amount of power estimated by the first estimating means so that when a next changed setting signal is detected, the first estimating means takes into account the power command error.

Preferably, the range of desired values is limited to a single desired value, the conditioning device is a heating device, the amount of power supplied to the conditioning device is limited to a maximum power amount, and the first estimating means for estimating the uniform amount of power comprises:

calculating means for calculating a value A where A=(the single desired value−the actual value);

measuring means for measuring an actual amount of power supplied to the heating device;

calculating means for calculating a first percentage of the maximum power amount that represents the actual amount; and calculating means for calculating a second percentage of the maximum power amount where the second percentage=(the first percentage+(A*the power command error)), the uniform amount of power being determined as the second percentage of the maximum power;

Preferably, the second estimating means for estimating the time-related upper and lower limit profiles HLV(t) and LLV(t) comprises:

determining means for determining whether the value A is positive or negative;

establishing means for establishing the lower limit profile LLV(t) by means of the following equation: LLV(t)=the single desired value−((the time period−Δt)*(A+a predetermined tolerance margin)/the time period) if the value A is positive which means that the actual value of the predetermined physical parameter has to be raised, Δt representing time elapsed since the beginning of the time period; and establishing means for establishing the upper limit profile HLV(t) by means of the following equation: HLV(t)= the single desired value if the value A is positive which means that the actual value of the predetermined physical parameter has to be raised;

establishing means for establishing the upper limit profile HLV(t) by means of the following equation: HLV(t)= the single desired value−((the time period−Δt)*(A−a predetermined tolerance margin)/the time period) if the value A is negative which means that the actual value of the predetermined physical parameter has to be lowered; and establishing means for establishing the lower limit profile LLV(t) by means of the following equation: LLV(t)=the single desired value if the value A is negative which means that the actual value of the predetermined physical parameter has to be lowered.

Preferably, the first estimating means sets the time period in relation to a predetermined initialization value when a first changed setting signal is detected, and it comprises the following means for upgrading the time period for each subsequent changed setting signal that is detected:

calculating means for calculating the following equation: the time period=a precedent time period+a gain*(a previous amount of power determined in step (i)−a predetermined fraction of the maximum power amount), where the gain and the predetermined fraction are fixed values determined by previous experimentations; and comparing means for comparing the time period with a range of acceptable time periods, if the time period is within the range of acceptable time periods then the time period is used, otherwise the time period is set to a closest value within the range of acceptable time periods.

Preferably, the apparatus comprises deferring means for deferring operation of the supplying means, the second monitoring means, the third controlling means and the third monitoring means at a time T1 to obtain the new range of desired values at a predetermined time T2, T1 being equal to T2 minus the time period, the first controlling means being in operation as long as the operations of the supplying means, the second monitoring means, the third controlling means and the third monitoring means are deferred.

The objects, advantages and other features of the present invention will become more apparent upon reading of the following non-restrictive description of preferred embodiments thereof, given for the purpose of exemplification only with reference to the accompanying drawings.

BRIEF DESCRIPTION OF THE DRAWINGS

FIGS. 6a–6d illustrate an algorithm showing another preferred embodiment of a method according to the present invention;

DETAILED DESCRIPTION OF PREFERRED EMBODIMENTS

Figure 1A:
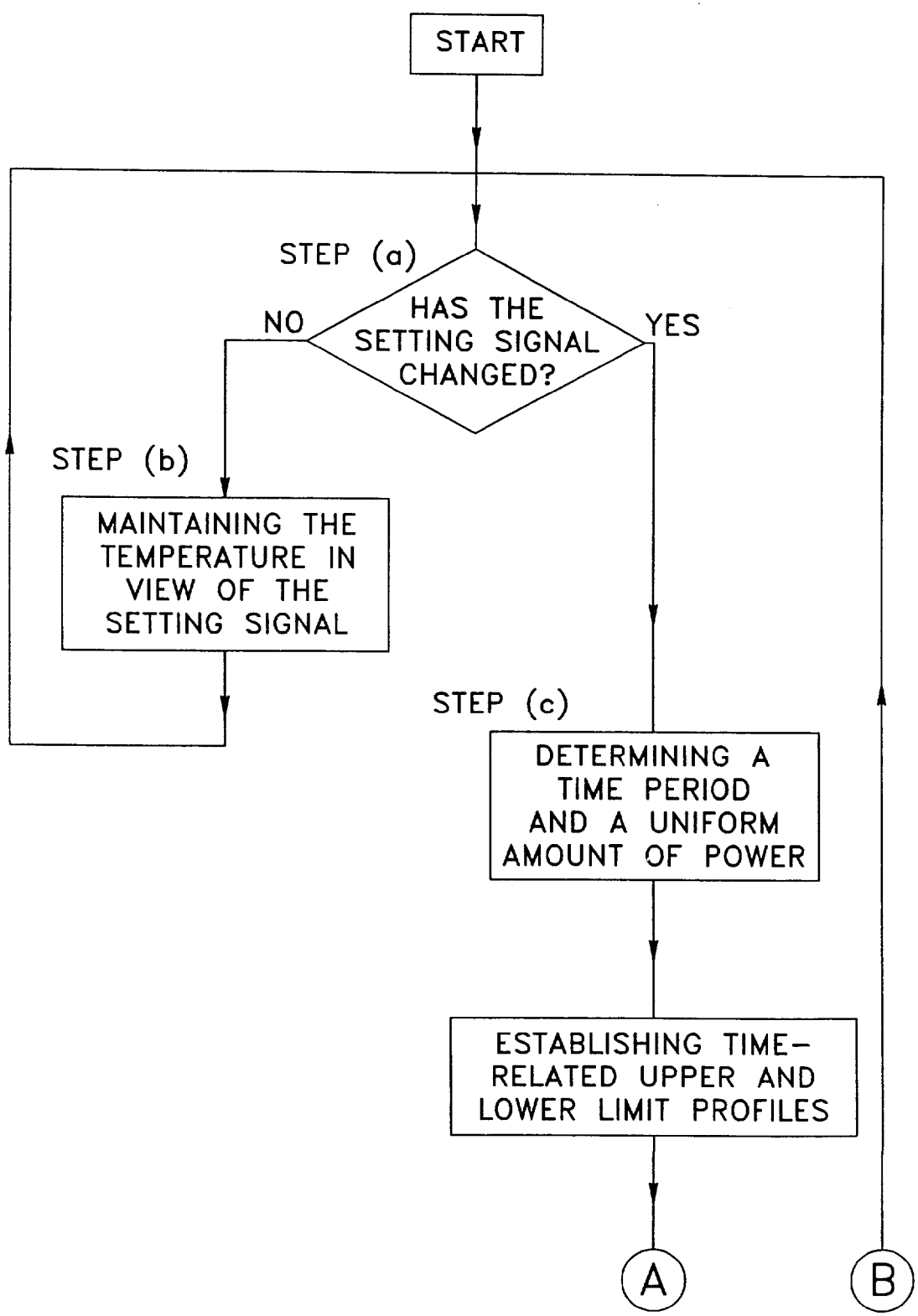
FIGS. 1a and 1b are an algorithm showing a preferred embodiment of a method according to the present invention.
Figure 1B:
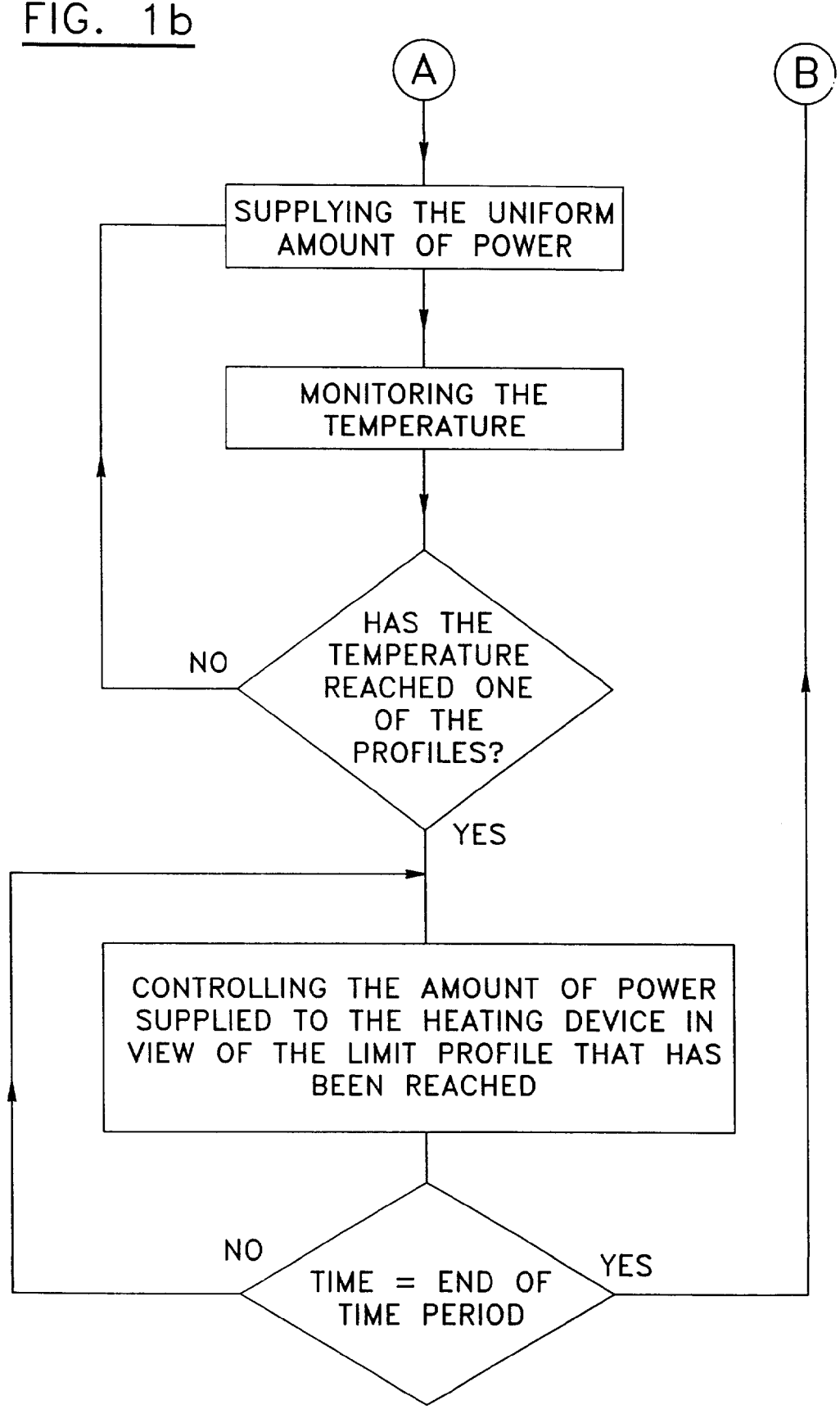

In the following description, similar elements throughout the drawings are identified by the same reference numbers. Referring now to FIG. 1, there are shown the steps of a method according to the present invention. The method is for controlling the amount of power supplied to a conditioning device acting on the actual value of a predetermined physical parameter within an area in relation to a setting signal. In the following description, we will consider that the predetermined physical parameter is temperature, and that the conditioning device is a heating device but the invention can be applied to other physical parameters and other conditioning devices.

The method is presented as an algorithm. The algorithm is used to limit power demand when a change in the temperature setting for an area is issued. The algorithm can be applied with different settings respectively to several areas such as the rooms of a house. In the present application, we will consider that each of the areas is heated by electrical energy but other types of energy can be used.

The method comprises three main steps. The first step consists in (a) monitoring the setting signal to detect a change thereof. As long as no change is detected, step (b) is executed. But when a new setting signal is issued and detected then the algorithm proceeds to step (c).

As mentioned above, step (b) is executed as long as the monitoring of step (a) fails to detect a change of the setting signal. This step (b) consists in controlling the amount of power supplied to the heating device to maintain the actual value of the temperature within a range of desired values determined by the current setting signal. This step (b) is essentially the normal operating mode where the heating device is controlled to react to the conditions and no effort is directed to spread over time the amount of power supplied to the heating device.

Also as mentioned above, step (c) is executed when the monitoring of step (a) detects a changed setting signal. This step (c) consists in performing several substeps. The substeps of step (c) includes steps (i) to (vi). Step (i) consists in determining both a time period and a uniform amount of power required by the heating device to cause the actual value of the temperature to theoretically reach a new range of desired values corresponding to the changed setting signal. The time period may be a predetermined fixed time period or a variable time period that is reevaluated and modified every time step (c) is executed.

Step (ii) consists in establishing time-related upper and lower limit profiles HLV(t) and LLV(t) of the temperature for the time period determined in step (i). The upper and lower limit profiles HLV(t) and LLV(t) have respectively different starting values, and converge toward the new range of desired values at the end of the time period. The actual value of the temperature is included in the range delimited by the starting values. The limit profiles define a range of temperature values within which the actual temperature is confined during the heating period to optimize the power distribution over that period.

Step (iii) consists in supplying the uniform amount of power determined in step (i) to the heating device. Step (iv) consists in monitoring the actual value of the temperature during the time period, and comparing it to the upper and lower limit profiles HLV(t) and LLV(t) to detect when the actual value of the temperature reaches one of these limit profiles.

Step (v) consists in, when the actual value of the temperature reaches one of the limit profiles HLV(t) and LLV(t), controlling the amount of power supplied to the heating device to cause the actual value of the temperature to follow substantially the limit profile HLV(t) or LLV(t) that has been reached for the remaining portion of the time period.

Step (vi) consists in monitoring time from the beginning of the time period and returning to step (a) when the time period ends.

The present invention can be implemented in different environments for process or ambient control. A person skilled in the art will understand that the environment may be completely hardware or a combination of hardware and software. In the present description, a preferred embodiment of the invention will be described as a combination of hardware and software. The software is described by means of algorithms.

Figure 2:
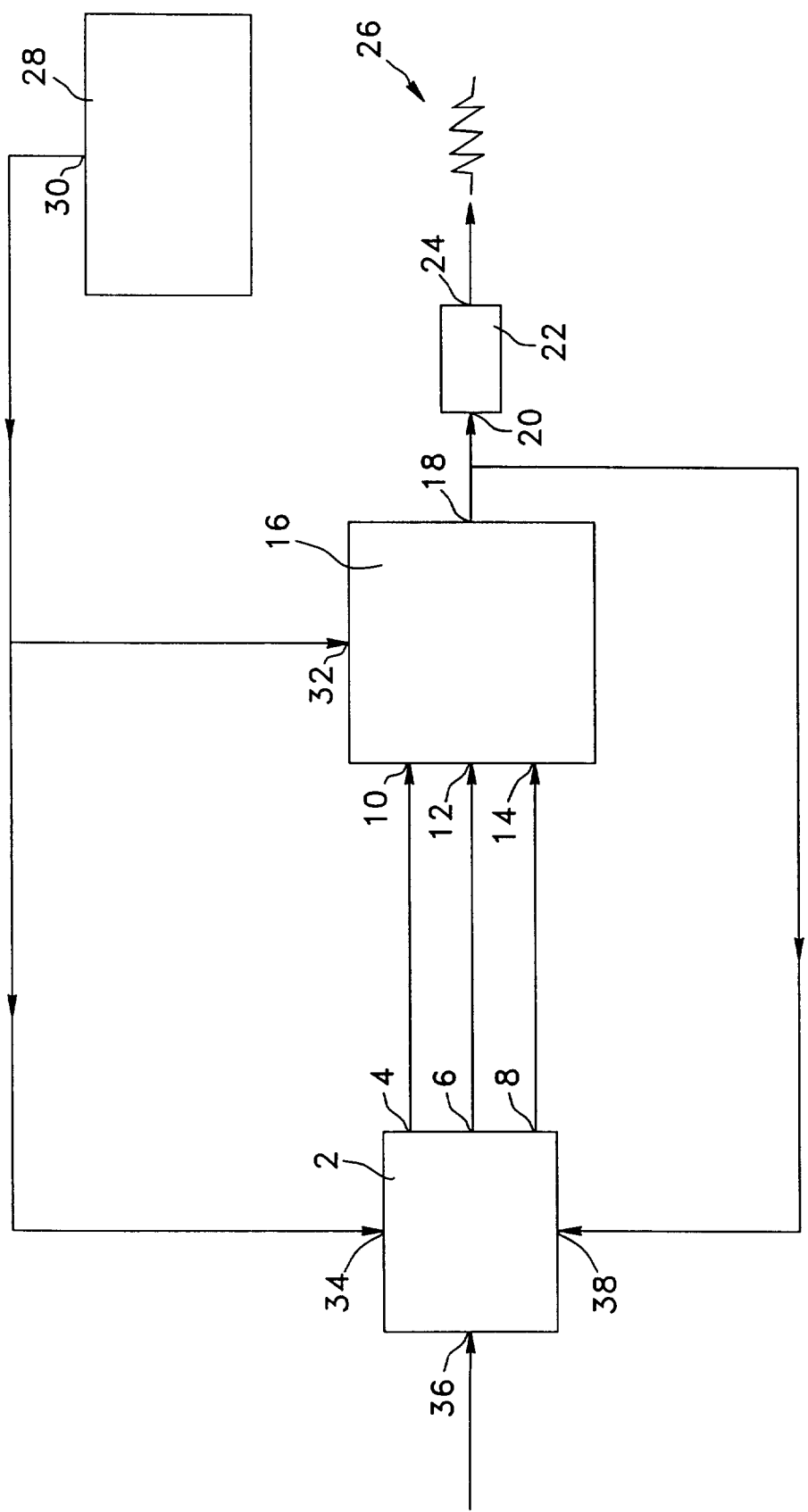
FIG. 2 is a block diagram of a preferred embodiment of the hardware environment into which the present invention is implemented.

Referring now to FIG. 2, there is shown a block diagram of a preferred embodiment of an apparatus with its environment according to the present invention. The apparatus is for controlling the amount of power supplied to a heating device 26 acting on the actual value of a temperature within an area in relation to a setting signal.

The apparatus comprises a power profiler 2 and a controller 16 which are provided with appropriate softwares for implementing all the means described hereafter. These means can be implemented in different manners and it is believed that a person skilled in the art will understand how to implement these means from the teaching of the present application.

The apparatus comprises a first monitoring means for monitoring the setting signal to detect a change thereof. This first monitoring means is preferably implemented by a power profiler 2 which receives the setting signal at its input 36.

The apparatus also comprises a first controlling means. This first controlling means controls the amount of power supplied to the heating device 26 as long as the first monitoring means does not to detect a change in the setting signal. The first controlling means maintain the actual value of the temperature in the area within a range of desired values determined by the setting signal. This first controlling means is implemented by the controller 16, the temperature measuring device 28 which measure the temperature within the room and the power regulator 24 which applies high power signal to the heating device 26. The controller 16 receives the setting signal from output 4 of the power profiler 2. The power profiler 2 can activate/deactivate the controller 16 by means of its output 6.

The apparatus also comprises a second controlling means. This second controlling means controls the amount of power supplied to the heating device 16 when the first monitoring means detects a changed setting signal. This second controlling means is implemented by means of the power profiler 2 that operates then through the controller 16, the temperature measuring device 28 and the power regulator 22. When the second controlling means is in operation, the power profiler 2 deactivates the controller 16 and controls the power regulator 22 through the controller 16 which is now transparent for control signals sent from the power profiler 2 to the power regulator 22.

This second controlling means comprises a determining means for determining a time period and a uniform amount of power required by the heating device 26 to cause the actual value of the temperature to theoretically reach a new range of desired values corresponding to the changed setting signal. The second controlling means also comprises an establishing means for establishing the time-related upper and lower limit profiles HLV(t) and LLV(t) as explained above, for the time period determined by the determining means. Both the determining means and the establishing means are implemented by the power profiler 2.

The second controlling means also comprises a supplying means for supplying the uniform amount of power determined by the determining means to the heating device 26. The supplying is implemented by the power regulator 22.

The second controlling means further comprises a second monitoring means for monitoring the actual value of the temperature during the time period to detect when the actual value of the temperature reaches one of the limit profiles HLV(t) and LLV(t). This second monitoring means uses the temperature signal produced by the temperature measuring device 28 and received at the input 34 of the power profiler 2. The second monitoring means is implemented by means of the temperature measuring device 28 and the power profiler 2.

The second controlling means further comprises a third controlling means for controlling the amount of power supplied to the heating device when the actual value of the temperature reaches one of the limit profiles HLV(t) and LLV(t). The action of this third controlling means is to cause the actual value of the temperature to follow substantially the limit profile HLV(t) or LLV(t) that has been reached for the remaining portion of the time period. The third controlling means is also implemented by means of the power profiler 2.

The second controlling means also comprises a third monitoring means for monitoring time from the beginning of the time period and returning the control of the amount of power supplied to the heating device to the first controlling means when the time period ends. The return of the power control to the first controlling means implies that the controller 16 is reactivated. The third monitoring means is implemented by means of the power profiler 2.

In the embodiment shown in FIG. 2, the power profiler 2 has three outputs 4, 6 and 8 connected respectively to three inputs 10, 12 and 14 of the controller 16. Output 18 of the controller 16 is connected to input 20 of a power regulator 22. The controller 16 is an integrated controller 16, which means that it can be activated and deactivated by the power profiler 2. For this purpose, the power profiler 2 has an output 6 that generates a signal for activating/deactivating the controller 16 via the input 12 thereof. When the controller 16 is activated, it operates in proportional mode which means that the output signal generated by the output 18 of the controller 16 is in relation to a setting signal received at input 10.

When the controller 16 is deactivated, it operates in command mode which means that the power profiler 2 takes over the command of the power regulator 22 through the controller 16 which is then transparent. The output signal generated by the output 18 of the controller 16 is then only determined by the command signal received at input 14 from the power profiler 2.

The proportional mode is in operation as long as there is no change in the setting signal received at input 36, this setting signal being directly sent to the controller 16 via output 4. The command mode is initiated when there is a change in the setting signal received at input 36. Then, the output signal generated at the output 18 of the controller 16 is directly determined by the output 8 of the power profiler 2.

The output 24 of the power regulator 22 is connected to heating device 26. The temperature is measured by a temperature measuring device 28 which has an output 30 connected respectively to inputs 32 and 34 of the controller 16 and the power profiler 2. This way, the power profiler 2 and the controller 16 are informed in real time of the actual temperature in the area. The setting signal for the area is sent to the power profiler 2 via input 36. The power profiler 2 also receives a feedback signal from the output 18 of the controller 16 via its input 38 to monitor the output signal sent to the power regulator 22. The power regulator 22 sends a power signal to the heating device 26 via its output 24.

All the steps of the method according to the present invention are performed by the power profiler 2, the controller 16, the power regulator 22 and the temperature measuring device 28, and therefore all the means of the apparatus according to the present invention are embodied by the power profiler 2, the controller 16, the power regulator 22 and the temperature measuring device 28.

When the apparatus shown in FIG. 2 is first put into operation, an initialization of the variables necessary for the operation of the apparatus is done. After initialization, the apparatus performs the steps of the method by executing the loop shown in FIG. 1. The variables which have been initialized are modified in view of the operating conditions each time a loop is executed. The setting signal received via input 36 is an external variable introduced within the loop. The steps of the loop are repeated according to regular time steps.

Figure 3:
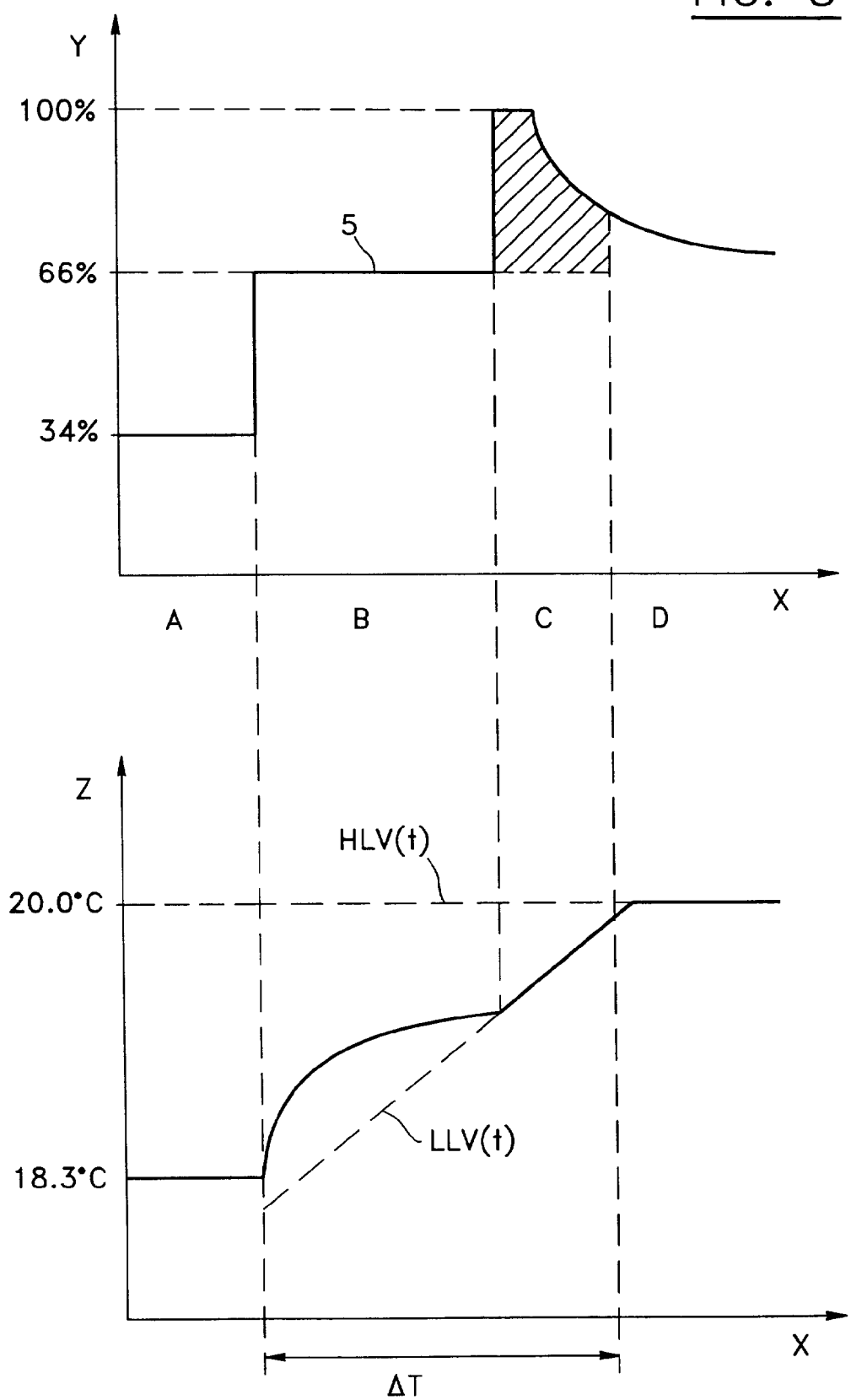
FIG. 3 illustrates upper and lower diagrams showing respectively the power supplied to the heating device and the temperature versus time for an operating scenario according to the present invention.

Referring now to FIG. 3 which will be described in relation to FIG. 2, there is shown in the upper part thereof a diagram illustrating power along axis Y versus time along axis X, and in the lower part thereof a diagram illustrating temperature along axis Z versus time along axis X. Similar diagrams also appear in FIGS. 4, 5, 8, 9, 10 and 11. The operating scenario that will be described takes into consideration that the power profiler 2 can deactivate the controller 16 and that the time period $\Delta T$ allowed to change the actual temperature in view of a new setting signal is fixed. These operating conditions also apply to scenarios shown in FIGS. 4 and 5.

During time period A, no change in the setting signal for the area is detected, the controller 16 being activated and commanding the necessary power for the heating device 26 to maintain the temperature according to the setting signal. Time period A can be considered as a standby operating period.

As soon as a new setting signal is detected for the area, time period A ends and time period B begins. In this case the new setting signal indicates that the temperature has to be raised. During time period B, the controller 16 is deactivated and the power profiler 2, first, determines a uniform amount of power 5 to be supplied, and upper and lower limit profiles HLV(t) and LLV(t), and, second, commands the uniform amount of power 5 for the heating device 26. While the uniform amount of power 5 is supplied to the heating device 26, the actual temperature within the area increases.

After a while the actual temperature reaches the lower limit profiles LLV(t). The reaching of one of the limit profiles by the actual temperature ends time period B, and time period C begins.

During time period C, the controller 16 is brought back into operation and commands the necessary amount of power for the heating device 26 so that the actual temperature follows the limit profile that has been reached for the remaining portion of the time period $\Delta T$. In this case the lower limit profile LLV(t) has been reached by the actual temperature which means that the uniform amount of power 5 determined by the power profiler 2 has been under estimated. During time period C, there is also performed a step of estimating the power command error of the uniform amount of power by integrating, over time period C, the difference between the amount of power supplied to the heating device 26 during time period C and the uniform amount of power determined by the power profiler 2. The area to be integrated is hatched in the upper diagram of FIG. 3. This step of estimating is performed by the power profiler 2. When a next changed setting signal is detected, the uniform amount is determined by the power profiler 2 by taking into account the power command error.

The end of time period $\Delta T$ also ends time period C, and time period D begins. During time period D the operating conditions are the same as those of time period A, which means that time period D can also be considered as a standby operating period.

Figure 4:
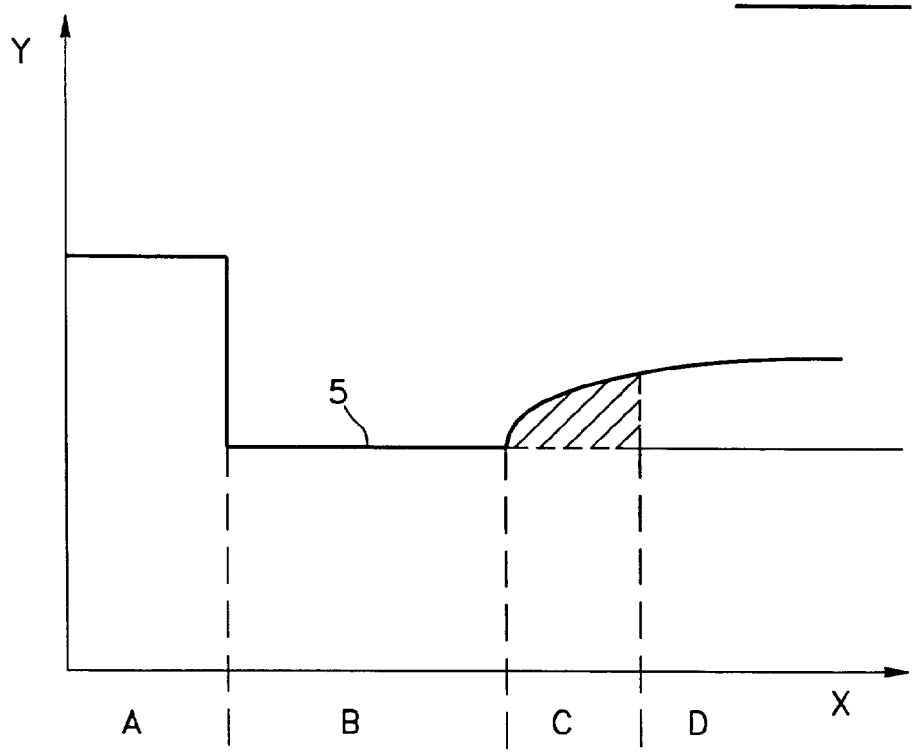
FIG. 4 illustrates upper and lower diagrams showing respectively the power supplied to the heating device and the temperature versus time for another operating scenario according to the present invention.
Figure 4:
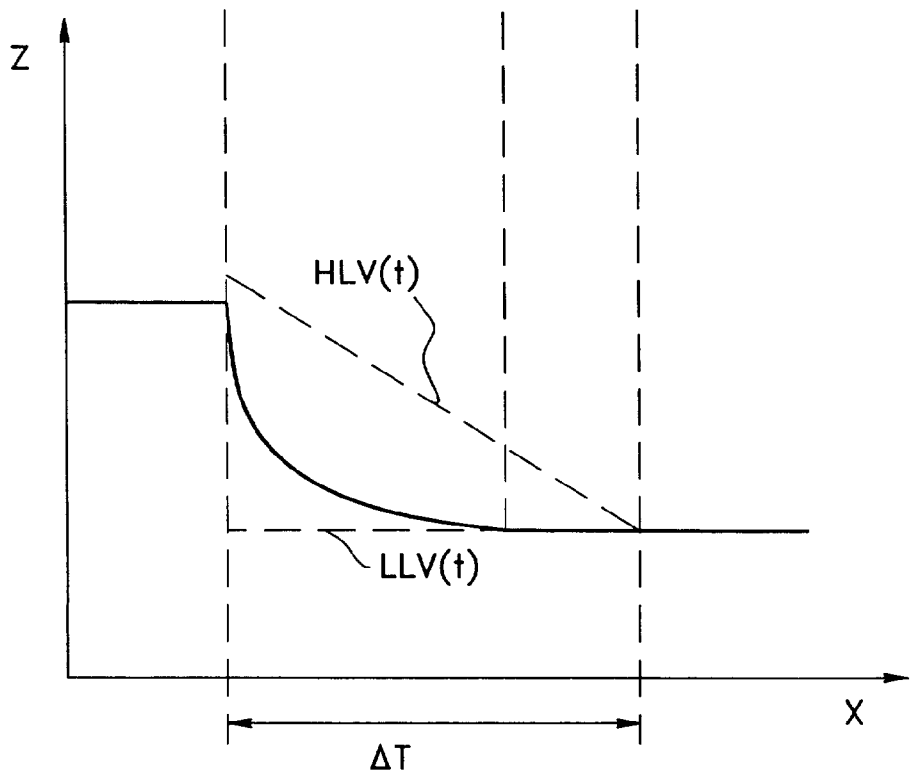

Referring now to FIG. 4, it will be described in relation to FIG. 2. In this case the new setting signal indicates that the temperature has to be dropped. While the uniform amount of power 5 is supplied to the heating device 26, the actual temperature within the area decreases.

After a while the actual temperature reaches the lower limit profile LLV(t), which means that the uniform amount of power 5 determined by the power profiler 2 has been under estimated.

Figure 5:
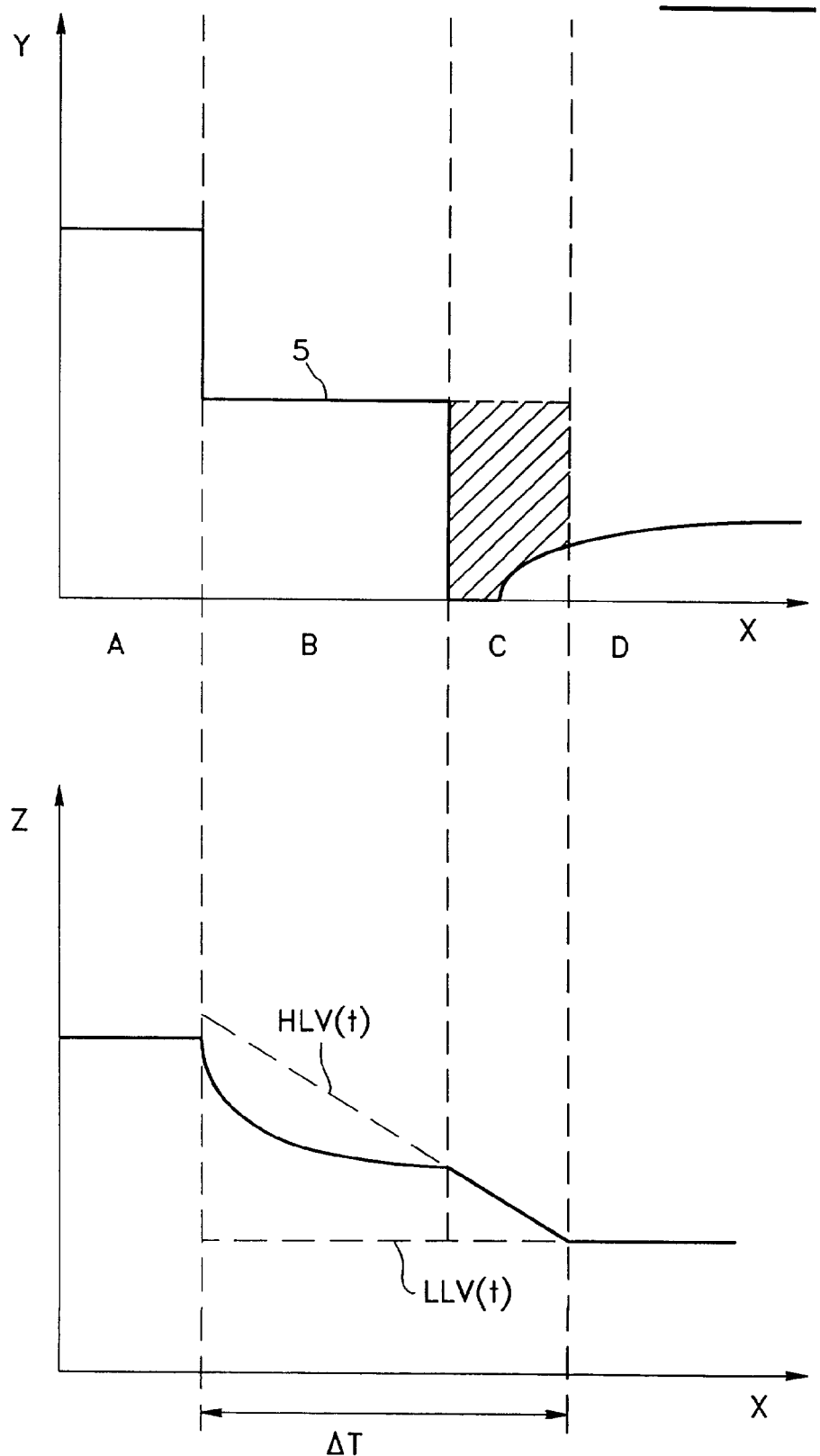
FIG. 5 illustrates upper and lower diagrams showing respectively the power supplied to the heating device and the temperature verses time for another operating scenario according the present invention.

Referring now to FIG. 5, it will be described in relation to FIG. 2. In this case the new setting signal indicates that the temperature has to be dropped. While the uniform amount of power 5 is supplied to the heating device 26, the actual temperature within the area decreases.

After a while the actual temperature reaches the upper limit profile HLV(t), which means that the uniform amount of power 5 determined by the power profiler has been over estimated.

Figure 6B:
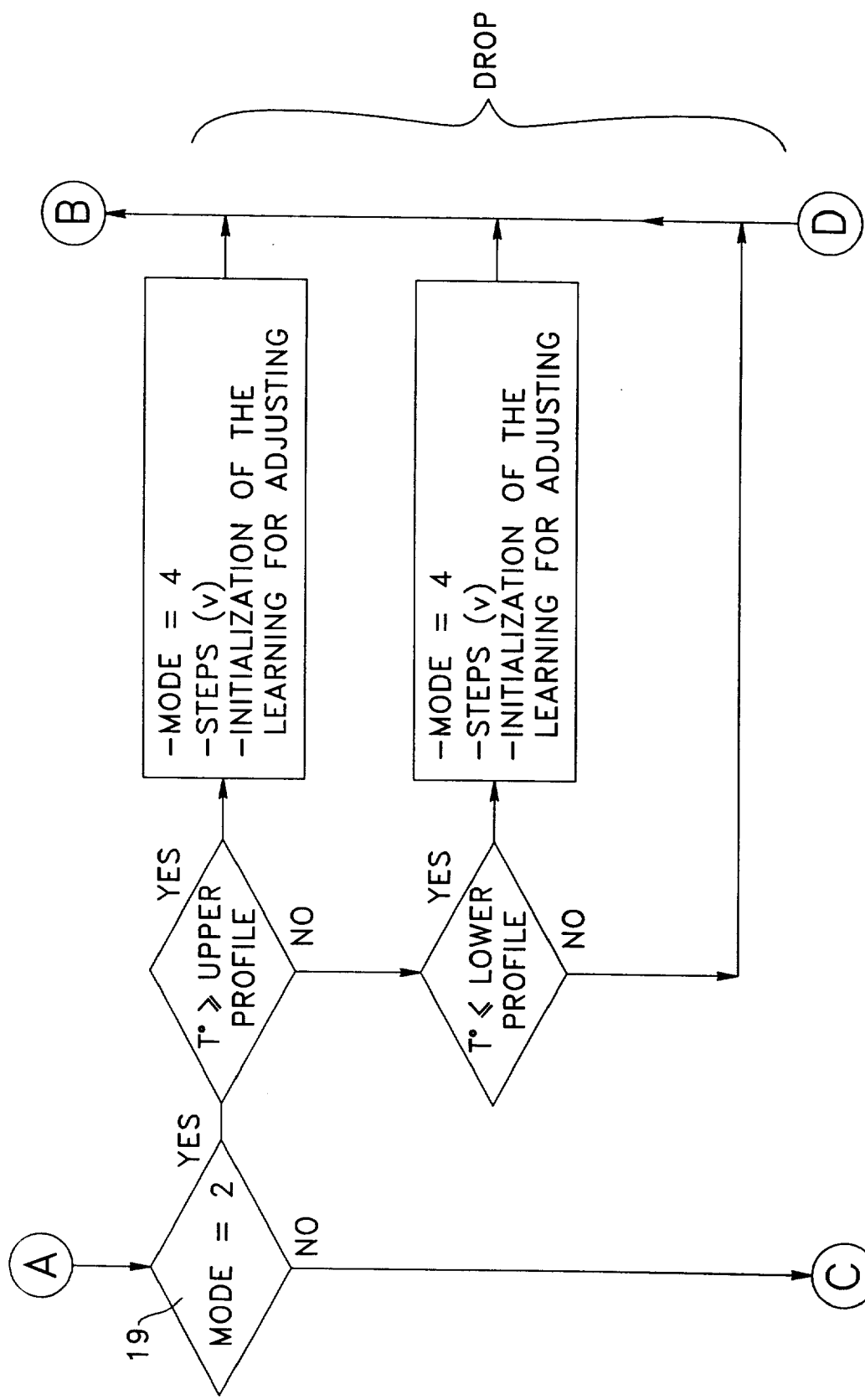
Figure 6C:
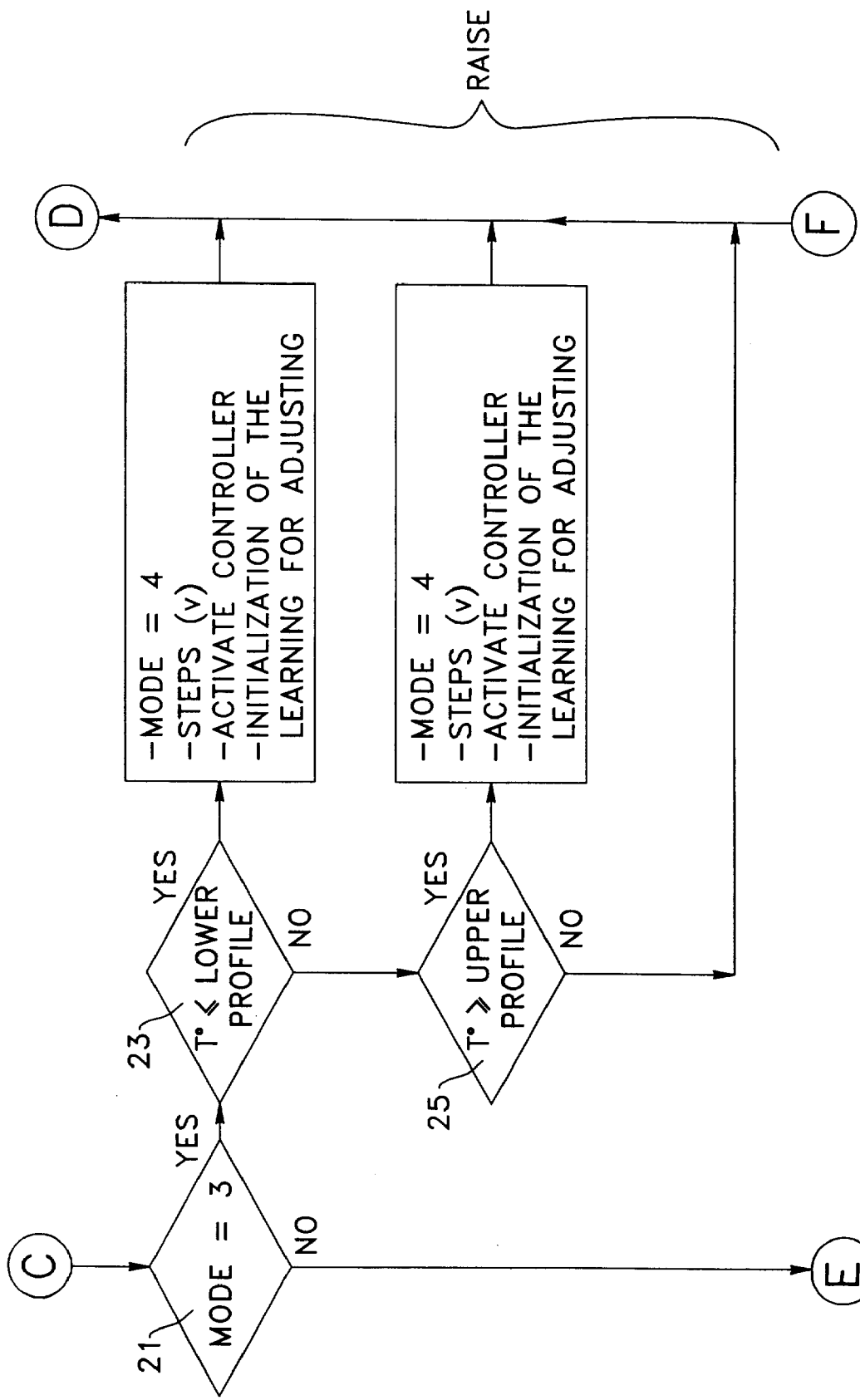
Figure 6D:
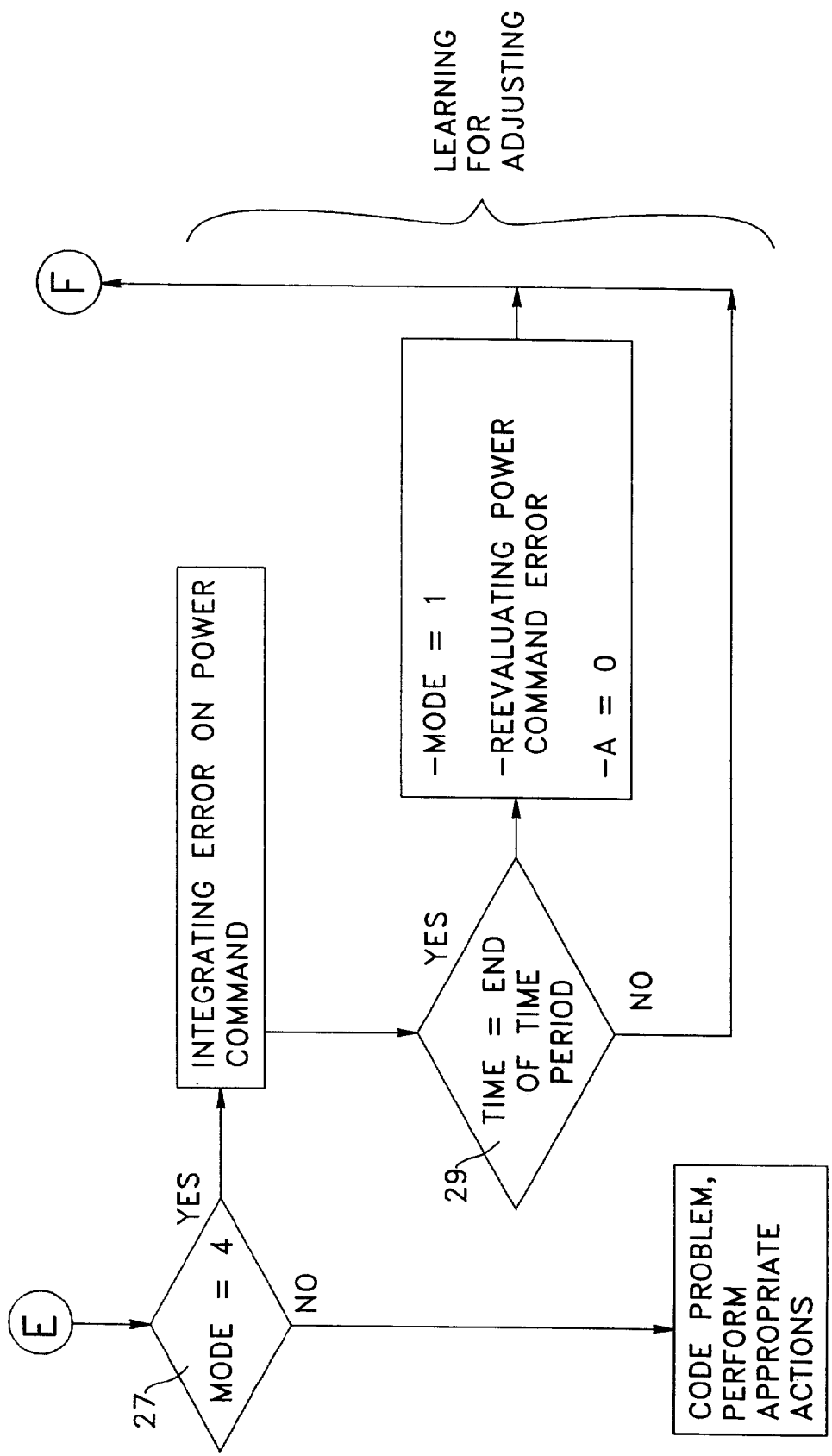

Referring now to FIG. 6 which will be described in relation to FIGS. 2 and 3, there is shown an algorithm showing a preferred embodiment of the method according to the present invention. In this example, the time period ΔT is a fixed time period of one hour. The controller 16 is an integrated controller 16, which means that it can be activated or deactivated by means of the power profiler 2.

The predetermined physical parameter to be controlled is the temperature of a room in a house. In this example, the new setting signal commands a raise of the temperature but the method can also be applied to a case where the new setting signal commands a drop of the temperature. The controller 16 is part of a thermostat. The heating device 26 is a baseboard heater located in the room. The thermostat is also provided with the temperature measuring device 28 for measuring the temperature in the room. The temporary values of the variables used throughout the algorithm are stored in RAM memories of the power profiler 2 and controller 16.

The occupant of the house sets a new desired temperature of 20° C. and a corresponding new setting signal is received at input 36 of the power profiler 2. The actual temperature is 18,3° C. and the previous setting signal was 18° C. The amount of power actually supplied to the heating device 26 to maintain the previous temperature of 18° C. represents 34% of the maximum power.

Before the first iteration within the loop shown in FIG. 6, the algorithm compares the new setting signal 20° C. to the previous setting signal of 18° C., 20° C.=18° C.±tolerance value?, sets a variable called new setting signal to 1 and memorizes it.

During the first iteration, as the variable called new setting signal has been set to 1, the response to the question step 11 is yes. The mode is set to 1 and stored. The algorithm also calculates the temperature difference between the new and previous setting signals and stores the result thereof in a variable called A, A=(20° C.−18,3° C.)=+1,7° C.

The response to question step 13 is also yes as the mode has been set to 1. Then, the algorithm determines whether the new setting signal means a temperature raise or a temperature drop. The algorithm compares the value A which is +1,7° C. to a tolerance value which is, for example, 0,5° C. As the result of the comparison is positive, the response to question step 15 is yes. But if the response had been no, the algorithm tests by means of question step 17 whether a temperature drop is requested by the occupant. If the response to the last question is still no, it means that the actual temperature is close to the desired temperature, within a range determined by the tolerance value of 0,5° C.

As the response to question step 15 is yes, the mode is set to 3 and memorized. The time period ΔT, the uniform amount of power to be supplied and the time-related upper and lower limit profiles HLV(t) and LLV(t) are determined by the power profiler 2. Also, the controller 16 is deactivated and the power profiler 2 takes over the control of the output signal sent to the power regulator 22 through the controller 16. The controller 16 is deactivated by a signal sent from output 6 of the power profiler 2 to input 12 of the controller 16. The calculation of the uniform amount of power is done by the following equation: (minimum(maximum (previous command %+gain*A), minimal command), maximum command))=(minimum(maximum (34%+18,8%/° C.*1,7° C.),0%), 100%)=66%. This means that the uniform amount of power is 66% of the available maximum power. The gain 18,8%/° C. is read from the RAM memory and is regularly adjusted every time the algorithm is executed by means of the learning for adjusting steps which will be described later on.

The time period ΔT is a predetermined time period of one hour, which means 3600 s. The occupant can decide whether he wants that the time period ΔT be started right away or be deferred so that the desired temperature be obtained later on at a specific time. In the present example, the period of time ΔT starts immediately. The algorithm calculates the theoretical time at which the applying of the uniform amount of power should be stopped. This time is equal to the actual time plus the time period ΔT. The actual time is set at 0 s so the time at which the applying of the uniform amount of power should stop is 3600 s. A timer is reset to 0 s every time the mode is set to 1. As shown in FIG. 3, the lower limit profile LLV(t) has a slope. This slope is determined by the following equation: (A+tolerance)/ΔT=(1,7° C.+0,5° C.)/3600 s=0,000611° C./s. As also shown in FIG. 3, the upper limit profile HLV(t) is a constant equal to 20° C. The first iteration of the loop is now terminated. The uniform amount of power supplied to the heating device 26 is 66% of the available maximum power. A new iteration of the loop is started every 10 s.

During the second iteration, the responses to question steps 11, 13, 19 and 21 are respectively no, no, no and yes because the setting signal has not changed since the first iteration and because the mode has been set to b 3which indicates that a raise was requested by the occupant. We will describe the steps that are performed when the mode is set to 3 but one will understand that analogue steps as shown in FIG. 6 are performed when a temperature drop is requested by the occupant and the mode is set to 2.

The algorithm monitors the actual temperature in view of the upper and lower limit profiles HLV(t) and LLV(t) by means of question steps 23 and 25 to detect when the actual temperature reaches one of the limit profiles HLV(t) and LLV(t). To perform the question step 23, first, the lower limit profile LLV(t) is calculated and, second, it is compared with the actual temperature. The lower limit profile LLV(t) is defined by the following equation: the new setting signal−(time at which the applying of the uniform amount of power ends−actual time)*slope of the lower limit profile LLV(t)=20° C.−(3600 s−10 s)*0,000611° C./s=17,81° C. The actual temperature measured by the temperature measuring device is 18,4° C. As this temperature is higher than the lower limit profile LLV(t) and lower than the upper limit profile HLV(t), then the responses to question steps 23 and 25 are respectively no and no. This iteration is now terminated. The algorithm will test the actual temperature with respect to the lower and upper limit profiles LLV(t) and HLV(t) every 10 s and responses to question steps 23 and 25 will be no and no until the 255th iteration which occurs at 2550 s from the beginning.

At the beginning of the 255th iteration, the actual temperature is 19,35° C. and the mode is still set to 3. The calculation of the lower limit profile LLV(t) is now (20° C.−(3600 s−2550 s)*0,000611° C./s)=19,36° C. As the actual temperature 19,35° C. is now lower than the lower limit profile which is 19,36° C., then the response to the question step 23 is yes. Then, the mode is set to 4 and memorized. The amount of power supplied to the heating device 26 is controlled to cause the actual temperature to follow substantially the lower limit profile LLV(t) for the remaining portion of the time period ΔT. In practice, the control of the amount of power supplied to the heating device 26 is now returned to the controller 16. The command signal sent from output 4 of the power profiler to input 10 of the controller 16 is set with a slope of 0,000611° C./s, which is the slope of the lower limit profile LLV(t) so that the actual temperature will follow substantially the lower limit profile LLV(t) as shown in the lower diagram of FIG. 3. Also, the estimation of the power command error is initialized to 0,0% s. This iteration is now terminated.

During the 256th iteration, as the mode has been set to 4, the response to question step 27 is yes and the algorithm enters the learning for adjusting steps shown in the lower part of FIG. 6. The algorithm integrates the power command error by calculating the following equation: power command error=previous power command error+(the actual amount of power supplied to the heating device 26–the uniform amount of power previously calculated)*one time step=0, 0% s+(66%–66%)*10 s. The result of this equation is 0,0% s at this time but in the following iterations while the actual amount of power supplied to the heating device 26 will increase to 100% the power command error will also increase, as shown in the upper diagram of FIG. 3.

Then, the algorithm tests the actual time with respect to the time limit ΔT by means of question step 29. At this time, the actual time is 2560 s and the time period ΔT is 3600 s, which means that the time period ΔT is not over yet. The setting signal sent from output 4 of the power profiler 2 to input 10 of the controller 16 is calculated by means of the following equation: setting signal=previous setting signal–(ΔT–actual time)* slope of the lower limit profile LLV(t)= 20° C.–(3600 s–2560 s)*0,000611° C./s=19,37° C. This iteration is now terminated.

In the following iterations, the setting signal applied to input 10 of the controller 2 is regularly adjusted in view of the slope 0,000611° C/s. The actual temperature will reached 19,97° C. around the 361st iteration, which occurs at time 3610 s.

During the 361st iteration, the setting signal applied to input 10 of the controller 16 substantially reaches the desired temperature of 20° C. The mode is still set to 4 and the power command error=25200% s+(81%–66%)*10 s=25350% s. As the actual time 3610 s is now higher than the time period ΔT 3600 s, the response to question step 29 is yes. Then, the mode is set to 1 and memorized. The controller 16 is now activated by the fixed setting signal of 20° C. The gain of the algorithm is updated and improved by means of the power command error. The updated gain=minimum (maximum (previous gain+(power command error/(ΔT*A)) *predetermined gain, minimum gain of the algorithm), maximum gain of the algorithm)=minimum (maximum (18, 8%/° C.+(25350% s/(3600 s *1,7° C.))*2; 10%/° C.); 100%/° C.)=27,1%/° C. The predetermined gain is a stored variable having a value of determined by previous experimentations. The minimum and maximum gains of the algorithm are predetermined stored variables. The gain value of 27,1%/° C. is memorized. The variable A is set to 0 and this iteration is now terminated.

Figure 7:
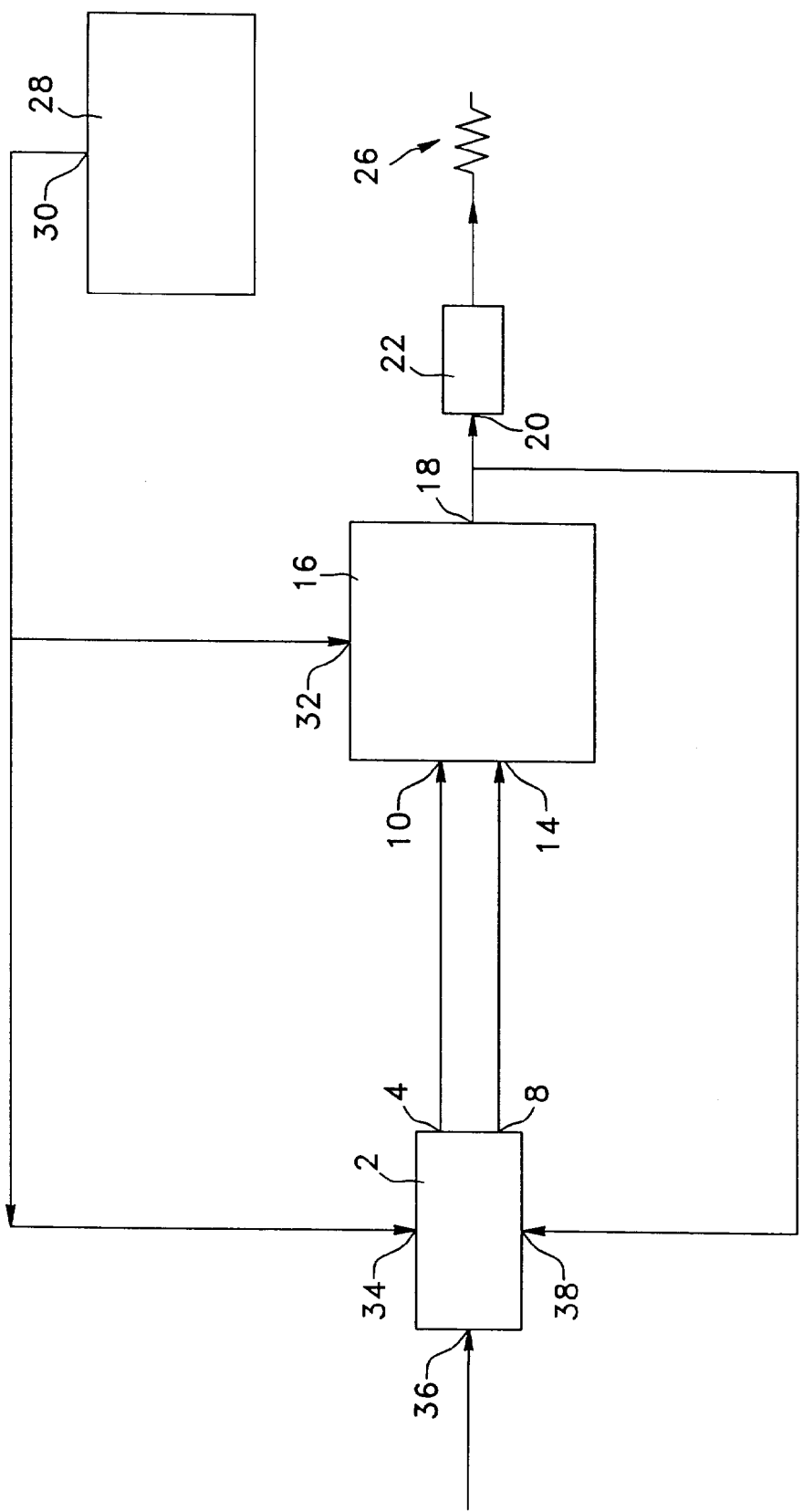
FIG. 7 is a block diagram of another preferred embodiment of the hardware environment into which the present invention is implemented.

After the 361th iteration, the setting signal sent to input 10 of the controller 16 is 20° C., the controller 16 regulates the temperature within the room in view of this setting signal of 20° C. The signal sent from output 8 to input 14 of the controller 16 is set to 100% to allow a wide operating range for the controller 16. The setting signal set by the occupant is monitored every 10 s. Referring now to FIG. 7, there is shown a block diagram of another preferred embodiment of an apparatus with its environment according to the present invention. The apparatus is similar to that shown in FIG. 1, except that the controller 16 is not an integrated controller as in FIG. 2 but rather an external controller, which means that the controller cannot be deactivated. The command signal sent from output 8 of the power profiler 2 to input 14 of the controller 16 is a maximum command signal that limits the value of the output signal generated by the controller 16 at its output 18. Even if the controller 16 cannot be deactivated, in practice the power profiler 2 can take over the control of the output signal generated at output 18 of the controller 16 by sending appropriate setting and command signals to inputs 10 and 14 of the controller 16.

As long as there is no change in the setting signal received at input 36, said setting signal is sent directly to input 10 of the controller 16 and the maximum command signal sent to input 14 is set to 100%. The controller 16 generates the proper output signal at its output 18 in view of the setting signal received at its input 10 and the temperature signal received at its input 32 to control the actual temperature within the area.

When there is a change in the setting signal received at input 36, the power profiler 2 takes over the control of the output signal generated at the output 18 of the controller 16 by sending appropriate setting and maximum command signals to inputs 10 and 14 of the controller 16.

Figure 8:
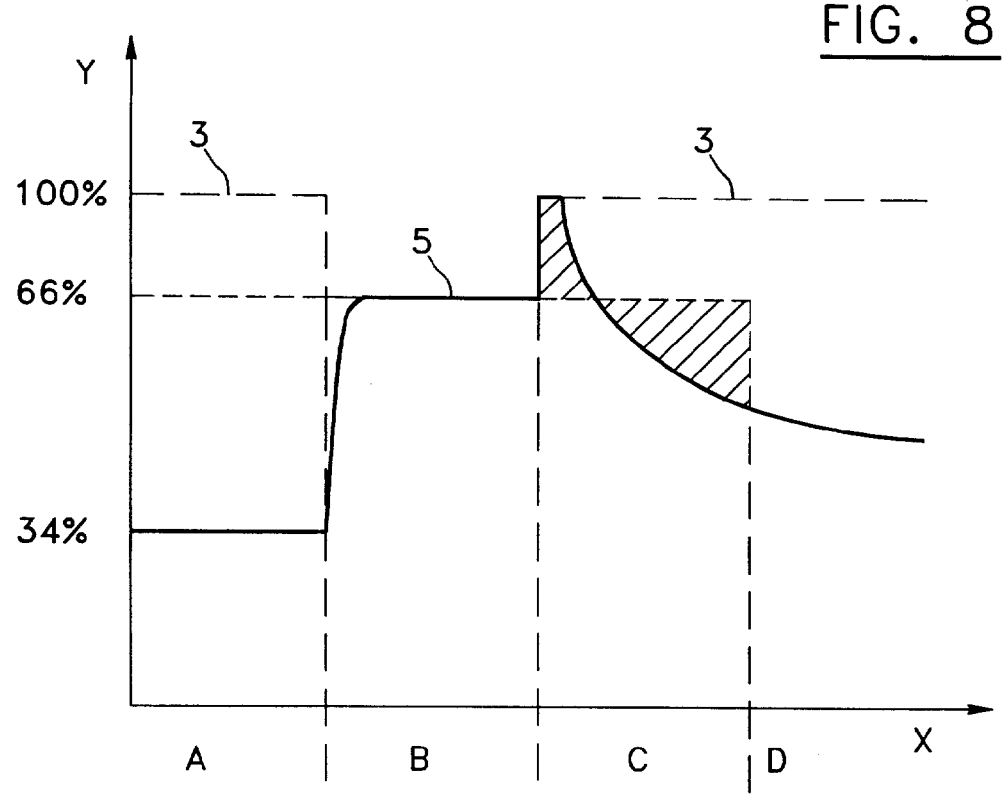
FIG. 8 illustrates upper and lower diagrams showing respectively the power supplied to the heating device and the temperature versus time for another operating scenario according the present invention.
Figure 8:
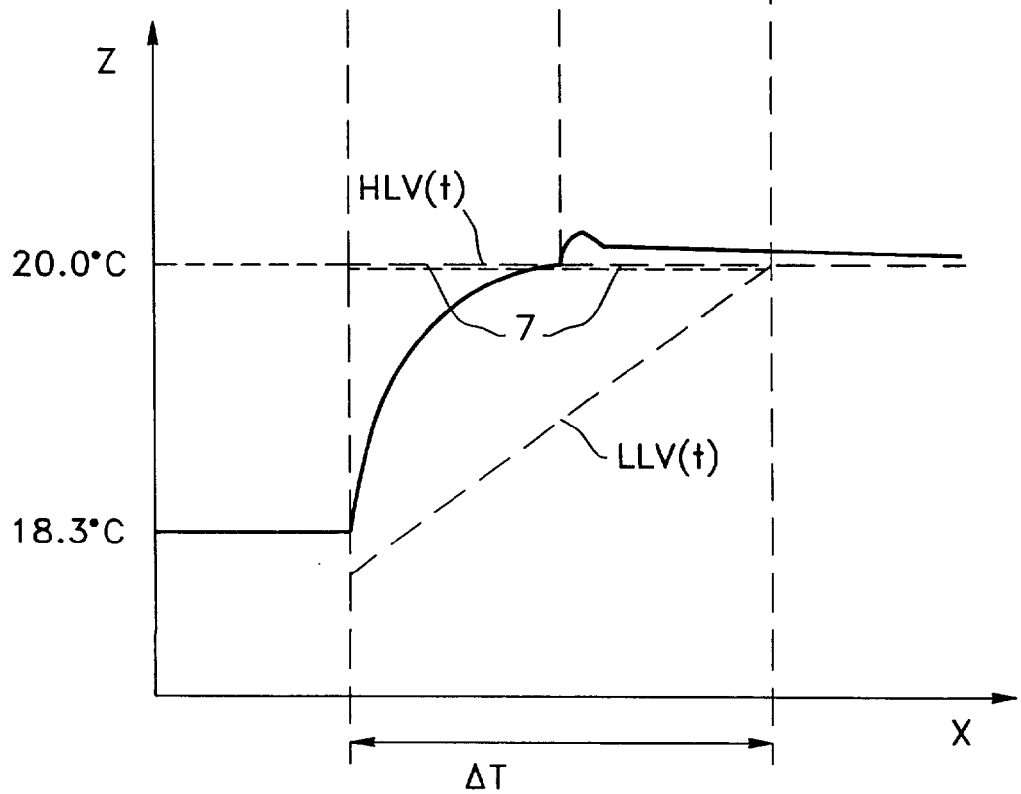

Referring now to FIG. 8, it will be described in relation to FIG. 7. The operating scenario that will be described takes into consideration that the power profiler 2 cannot deactivate the controller 16 but can control the output signal generated at output 18 through the controller 16, and that the time period ΔT allowed to change the actual temperature in view of a new setting signal can be regularly upgraded. These operating conditions also apply to scenarios shown in FIGS. 9, 10 and 11.

During time period A, no change in the setting signal of 18° C. for the area is detected, the controller 16 commanding the necessary power for the heating device 26 to maintain the temperature according to the setting signal received at input 10. The actual temperature is 18,3° C. The power profiler 2 applies a maximum command signal 100% to input 14 of the controller 16 to allow a high potential power 3 so that the controller 16 can operate within a wide operating range to maintain the temperature according to the setting signal received at input 10. Time period A can be considered as a standby operating period.

As soon as a new setting signal is detected for the area, time period A ends and time period B begins. In this case the new setting signal of 20,0° C. means that the temperature has to be raised. During time period B, the power profiler 2, first, determines a uniform amount of power 5 to be supplied, and upper and lower limit profiles HLV(t) and LLV(t), and, second, provides the appropriate setting and maximum command signals to input 10 and 14 of the controller 16 to supply the uniform amount of power 5 to the heating device 26. The upper limit profile HLV(t) is set to be equal to 20,0° C. The setting signal 7 applied to input 10 of the controller 16 corresponds to the setting signal of 20° C. received at input 36 for the whole of the time period ΔT.

While the uniform amount of power 5 is supplied to the heating device 26, the actual temperature within the area increases. After a while the actual temperature reaches the upper limit profile HLV(t). The reaching of one of the limit profiles by the actual temperature ends time period B, and time period C begins.

During time period C, the power profiler 2 applies the maximum command signal to input 14 of the controller 16 so that the controller 16 can operates to its full potential which is up to the high potential power 3. The controller 16 commands the necessary amount of power for the heating device 26 so that the actual temperature follows substantially the limit profile that has been reached for the remaining portion of the time period ΔT. In this case the upper limit profile HLV(t) has been reached by the actual temperature which means that the uniform amount of power 5 determined by the power profiler has been over estimated.

Figure 9:
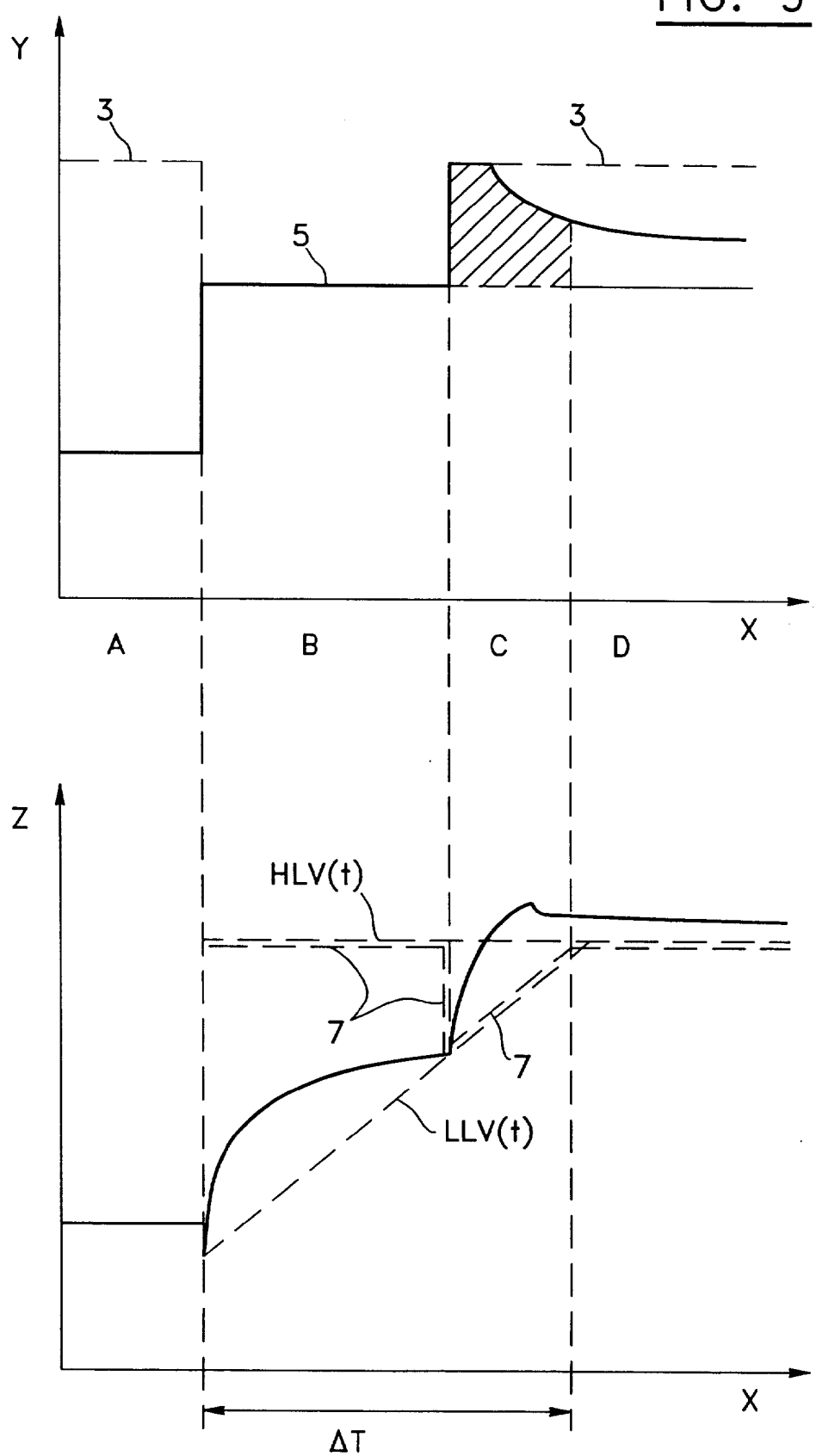
FIG. 9 illustrates upper and lower diagrams showing respectively the power supplied to the heating device and the temperature versus time for another operating scenario according to the present invention.

Referring now to FIG. 9, it will be described in relation to FIG. 7. In this case the new setting signal indicates that the temperature has to be raised. The upper limit profile HLV(t) is set to be equal to the setting signal received at input 36. The setting signal 7 applied to input 10 of the controller 16 corresponds to the setting signal received at input 36 for time period B only. For the remaining portion of the time period ΔT, which is time period C, the setting signal 7 applied to the input 10 is set to fit the lower limit profile LLV(t).

While the uniform amount of power 5 is supplied to the heating device 26, the actual temperature within the area increases. After a while the actual temperature reaches the lower limit profile LLV(t), which means that the uniform amount of power 5 determined by the power profiler has been under estimated.

Figure 10:
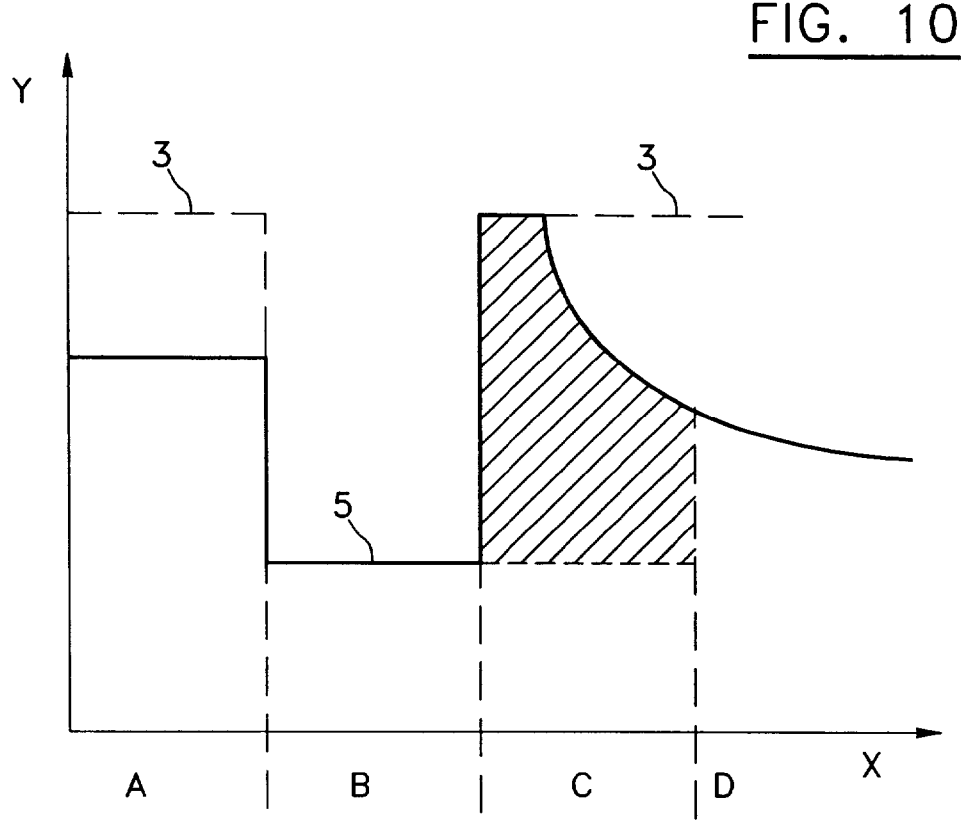
FIG. 10 illustrates upper and lower diagrams showing respectively the power supplied to the heating device and the temperature versus time for another operating scenario according to the present invention.
Figure 10:
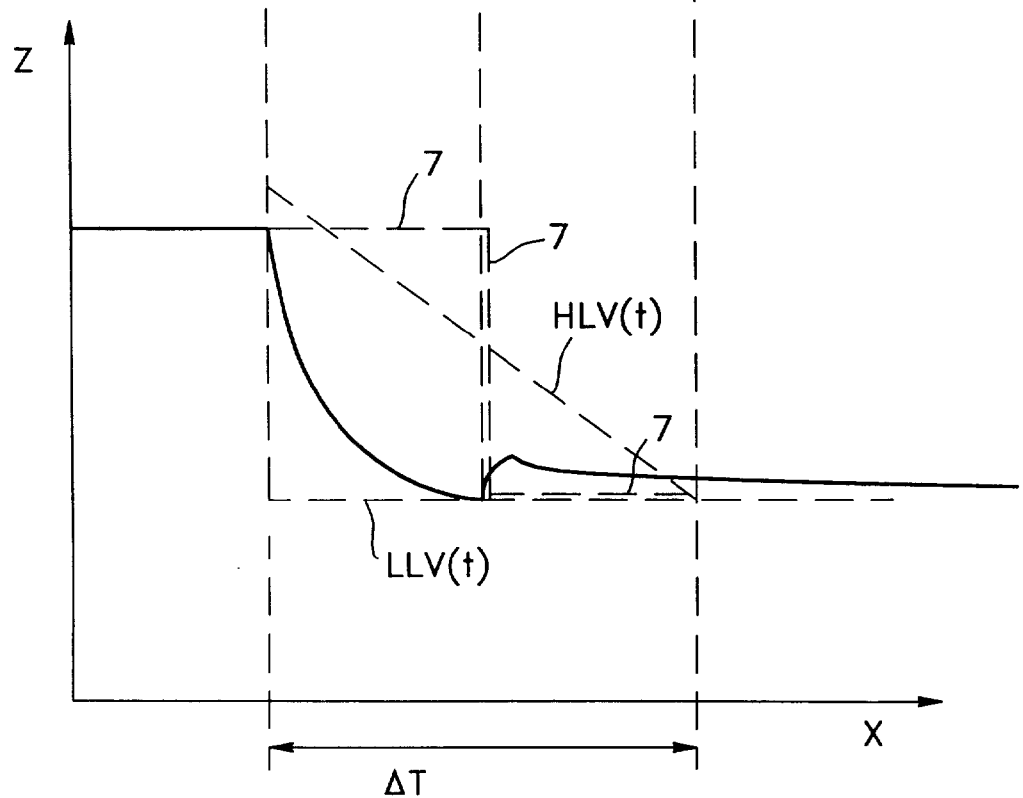

Referring now to FIG. 10, it will be described in relation to FIG. 7. In this case the new setting signal indicates that the temperature has to be dropped. The lower limit profile LLV(t) is set to be equal to the new setting signal received at input 36. During time period B, the setting signal 7 applied to the input 10 is set to fit the value of the setting signal received at input 36 during previous time period A. For the remaining portion of the time period ΔT, which is time period C, the setting signal 7 is set to fit the lower limit profile LLV(t).

While the uniform amount of power 5 is supplied to the heating device 26, the actual temperature within the area decreases. After a while the actual temperature reaches the lower limit profile LLV(t), which means that the uniform amount of power 5 determined by the power profiler has been under estimated.

Figure 11:
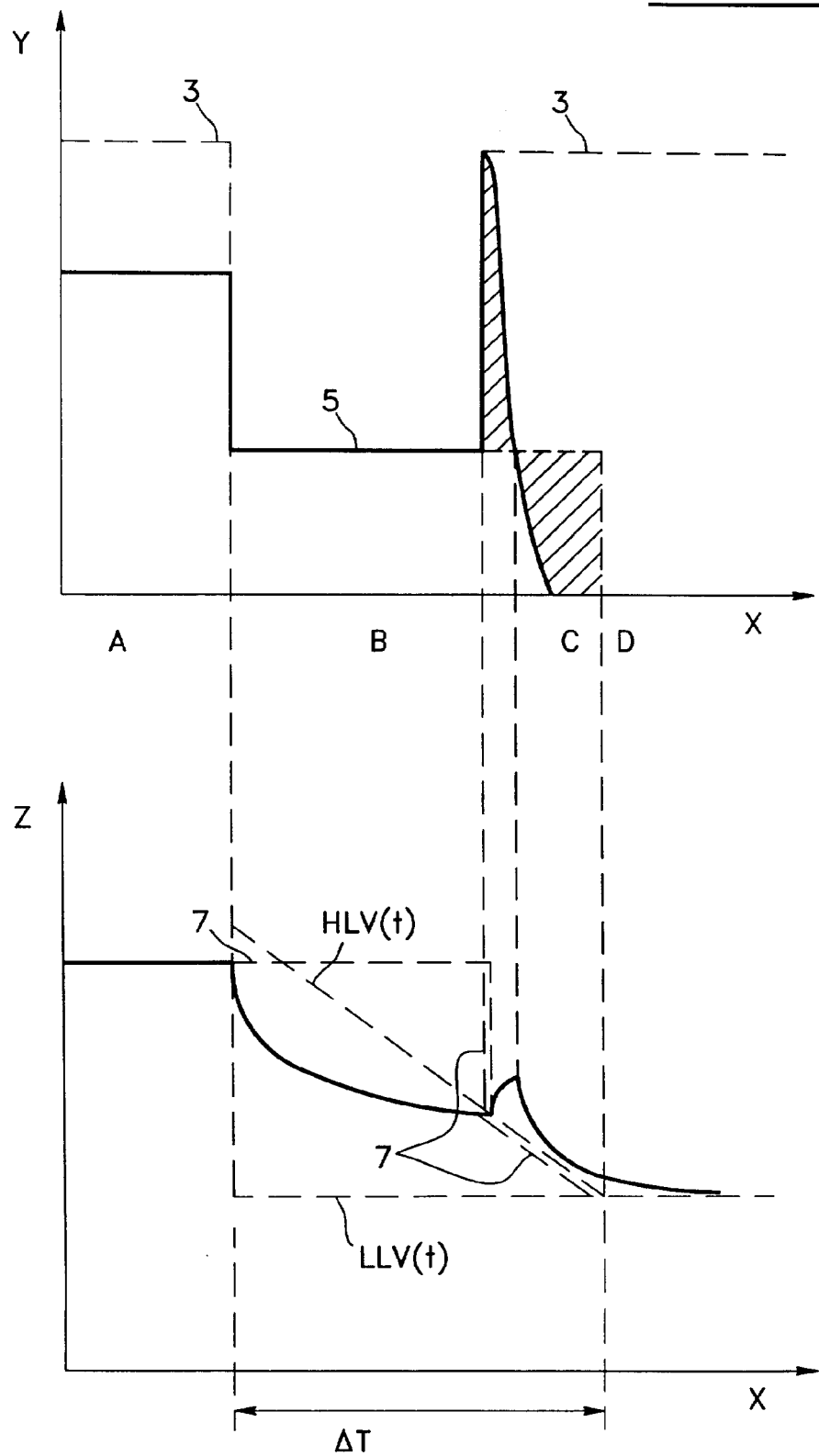
FIG. 11 illustrates upper and lower diagrams showing respectively the power supplied to the heating device a the temperature versus time for another operating scenario according to the present invention.
Figure 12A:
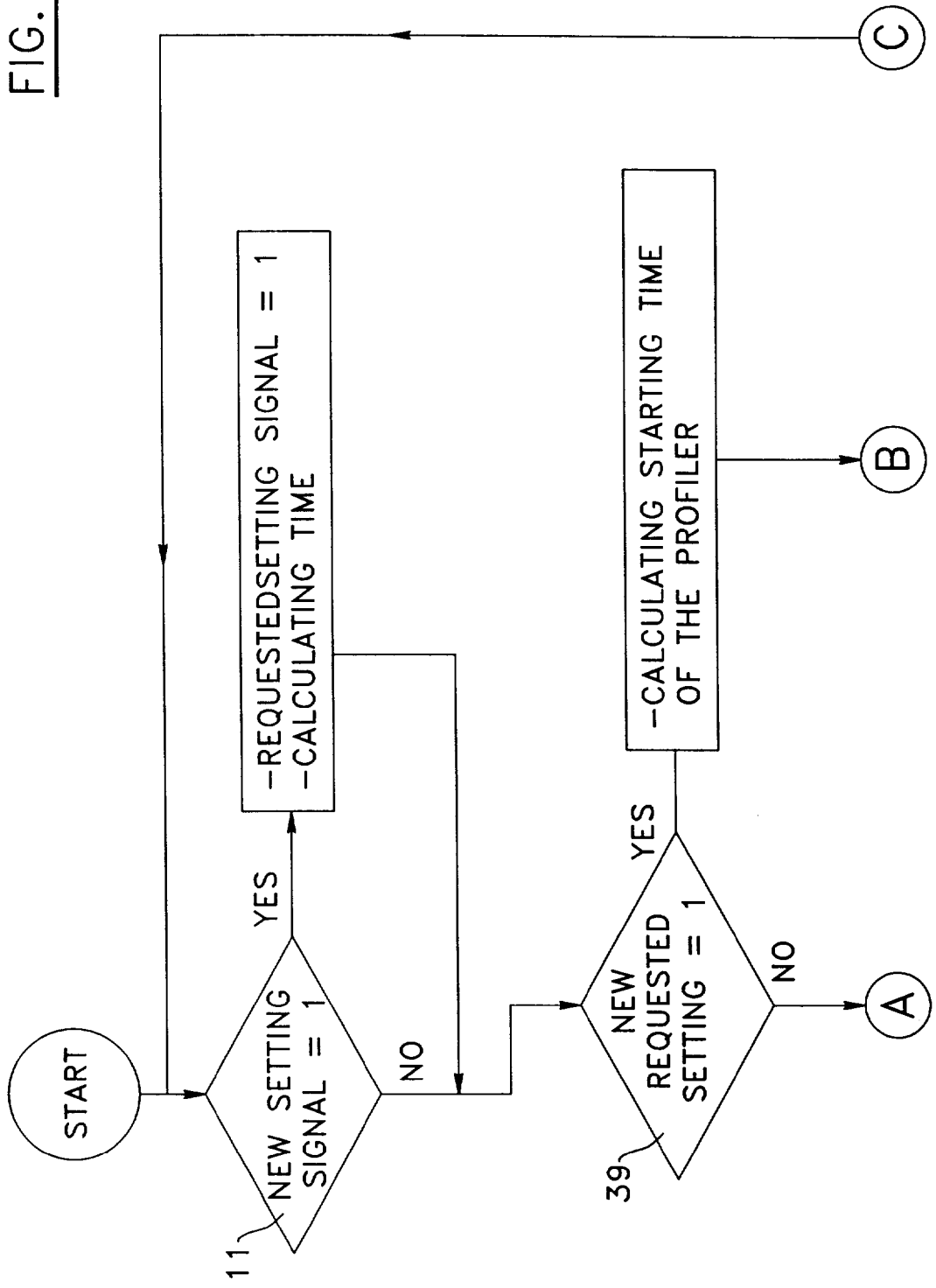
FIGS. 12a–12e an illustrate algorithm showing another preferred embodiment of a method according to the present invention.
Figure 12B:
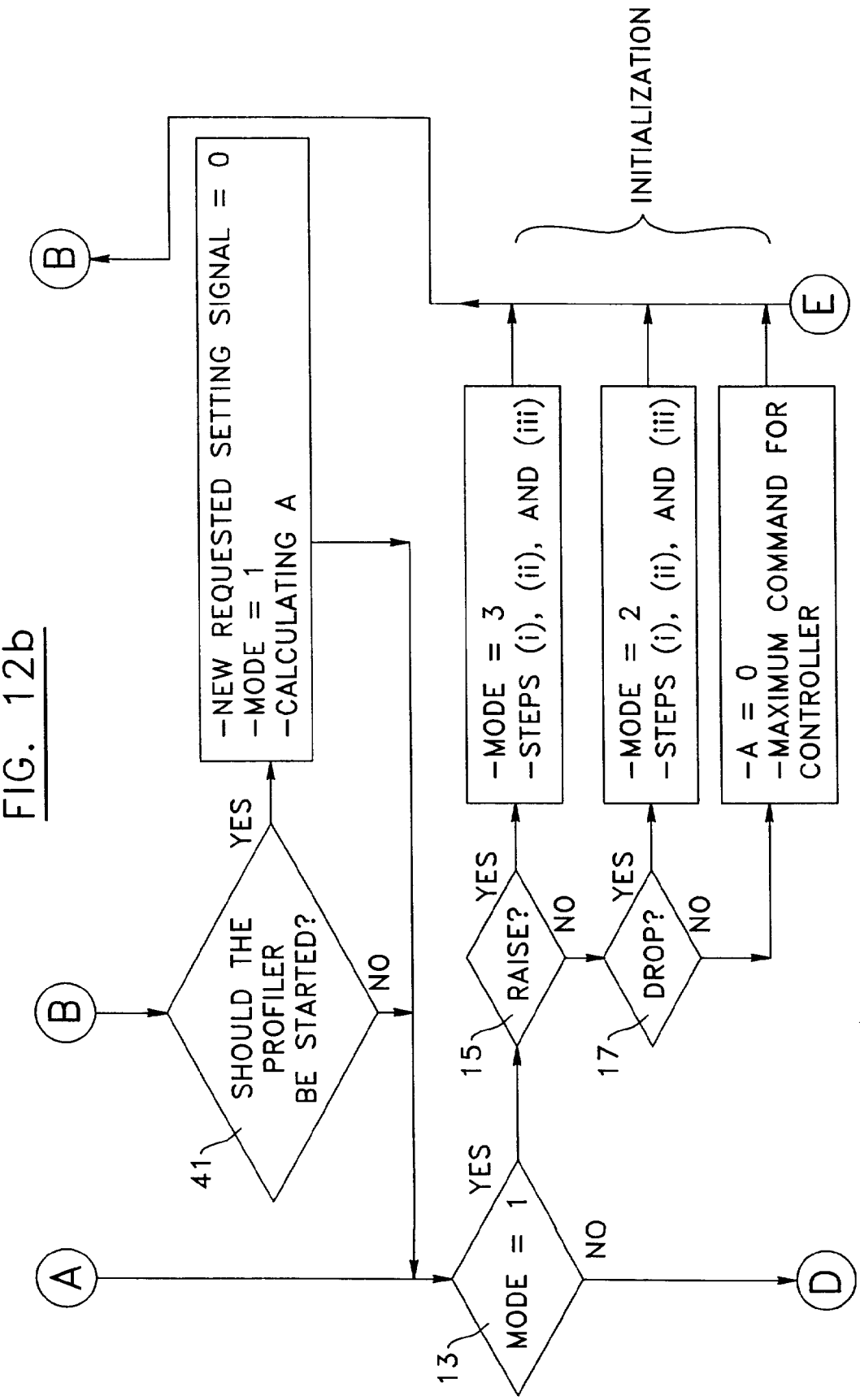
Figure 12C:
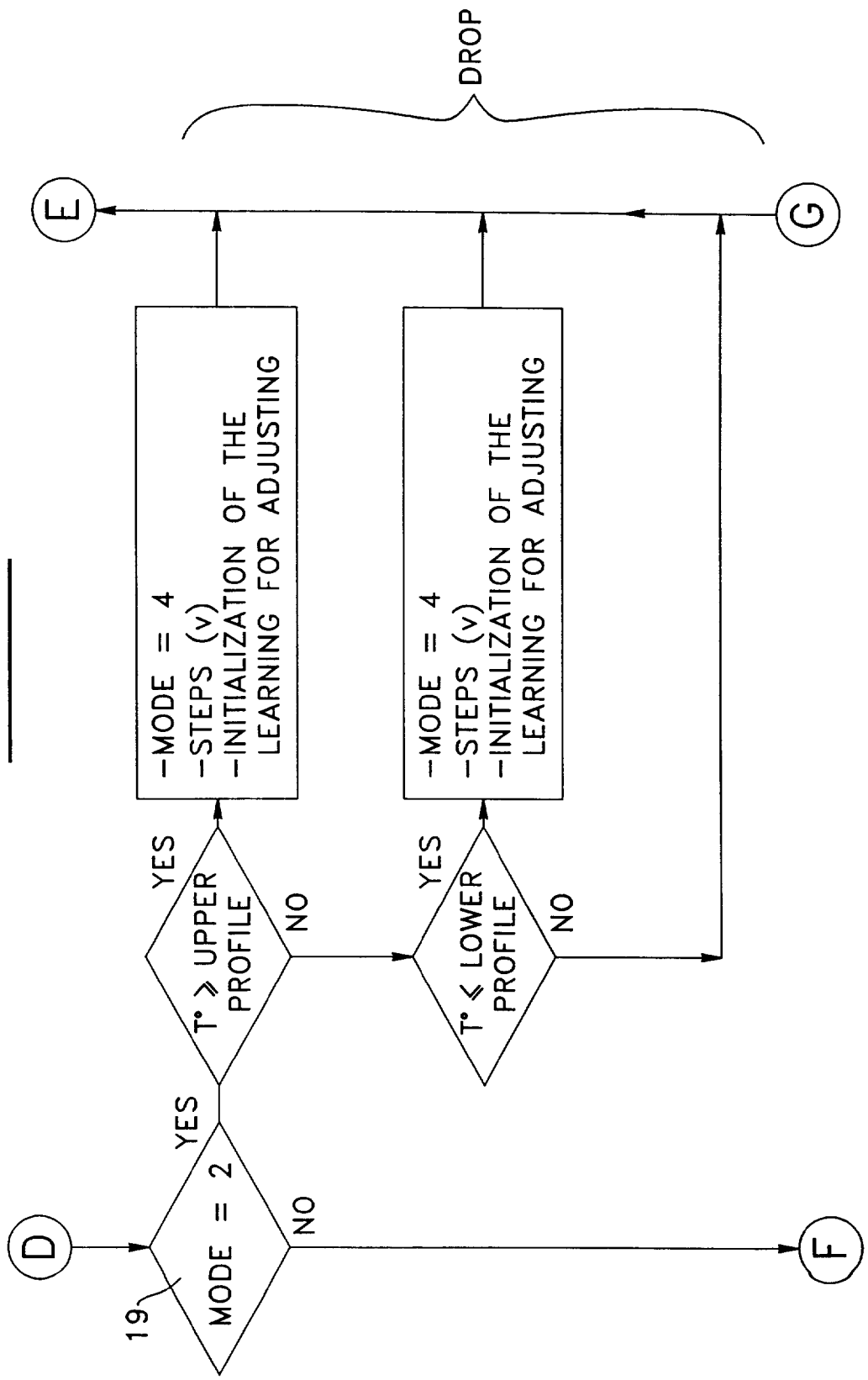
Figure 12D:
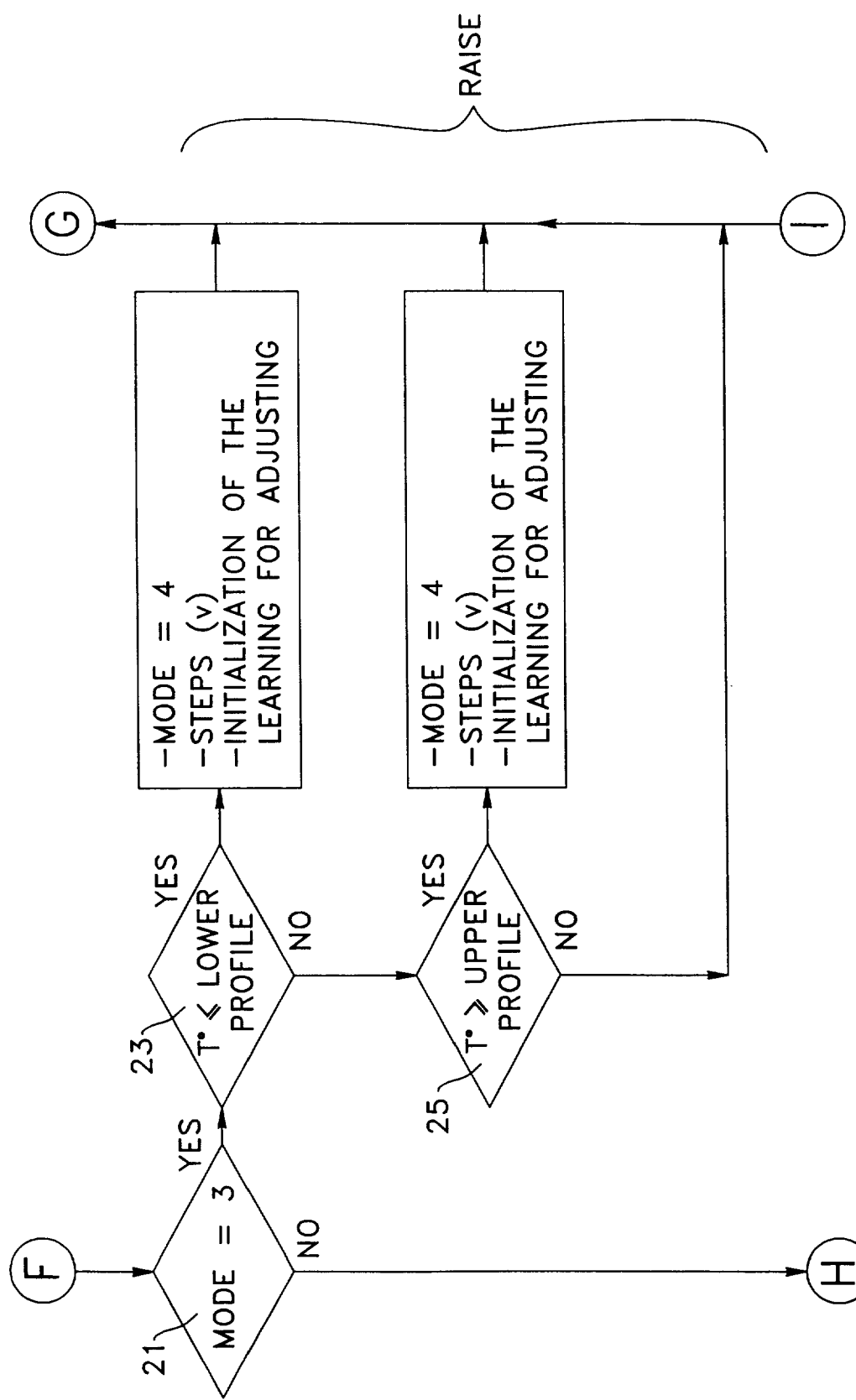
Figure 12E:
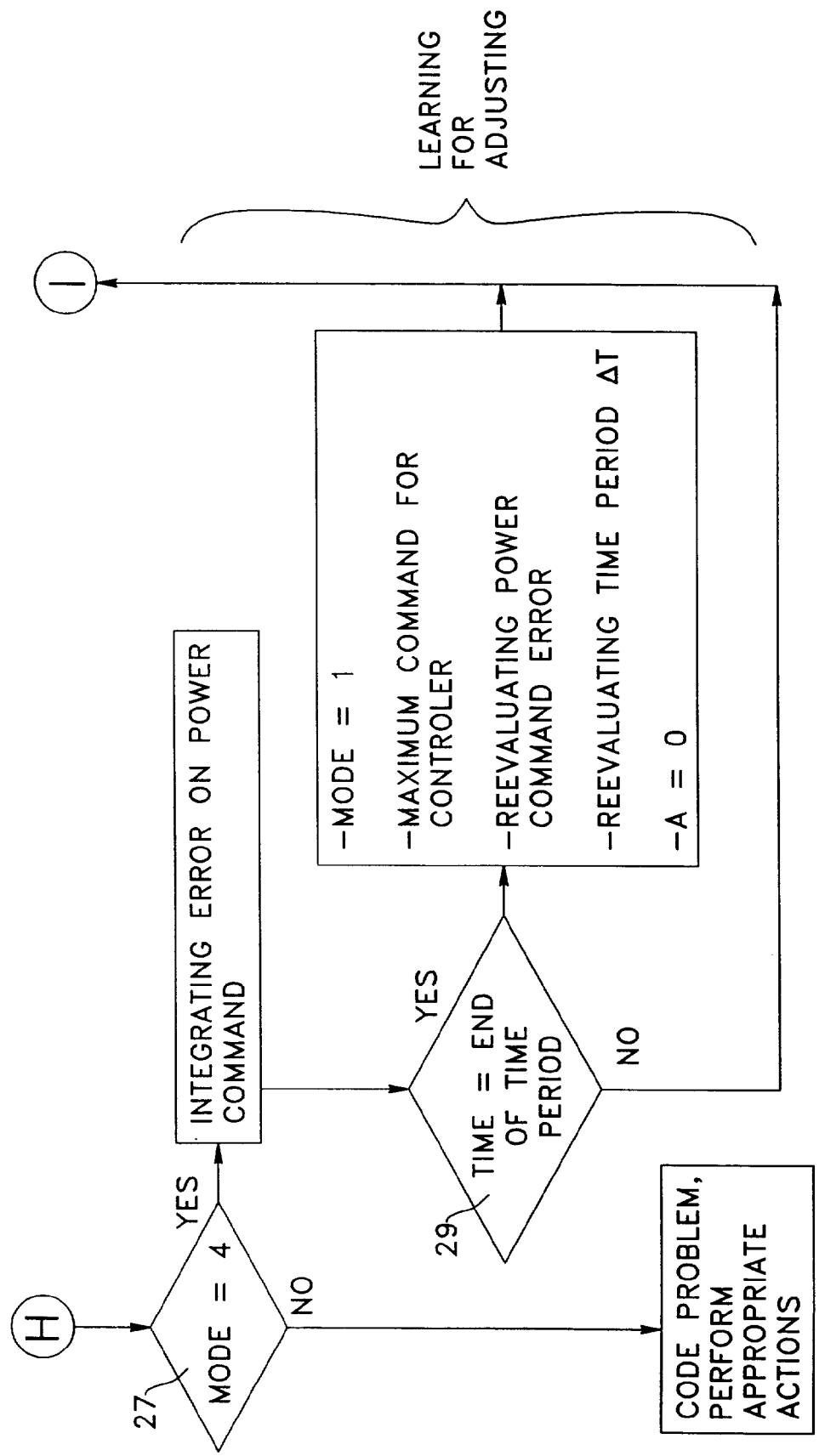

Referring now to FIG. 11, it will be described in relation to FIG. 7. In this case the new setting signal indicates that the temperature has to be dropped. The lower limit profile LLV(t) is set to be equal to the new setting signal received at input 36. During time period B, the setting signal 7 applied to the input 10 is set to fit the value of the setting signal received at input 36 during previous time period A. For the remaining portion of the time period ΔT, which is time period C, the setting signal 7 is set to fit the upper limit profile HLV(t).

While the uniform amount of power 5 is supplied to the heating device 26, the actual temperature within the area decreases. After a while the actual temperature reaches the upper limit profile HLV(t), which means that the uniform amount of power 5 determined by the power profiler has been over estimated.

Referring now to FIG. 12 which will be described in relation to FIGS. 7 and 8, there is shown an algorithm showing another preferred embodiment of the method according to the present invention. In this example, the time period ΔT is a time period that is upgraded every time the algorithm is executed. The controller 16 is an external controller 16, which means that it cannot be deactivated by the power profiler 2. Because of that, when according to the algorithm the power profiler 2 takes over the control of the amount of power supplied to the heating device 16, the controller 16 is not deactivated but rather controlled by the power profiler 2 which applies appropriate signals to inputs 10 and 14 of the controller 16 so that the resulting signal generated at output 18 of the controller 16 is in fact controlled by the power profiler 2.

In this example, the new setting signal commands a raise of the temperature but the method can also be applied to a case where the new setting signal commands a drop of the temperature. The temporary values of the variables used throughout the algorithm are stored in RAM memories of the power profiler 2 and controller 16.

The occupant of the house sets a new desired temperature of 20° C. and a corresponding new setting signal is received at input 36 of the power profiler 2. The occupant also specifies that this temperature of 20° C. should be delivered in four hours, the actual time being 01 hr:30 min PM. The actual temperature is 18,3° C. and the previous setting signal was set to 18° C. The amount of power actually supplied to the heating device 26 to maintain the previous temperature of 18° C. represents 34% of the maximum power. The current operating mode of the algorithm is 1. Variable A has a current value of 0. The control of the amount of power applied to the heating device is done by the controller 16, and a maximum command of 100% is applied to input 14 thereof by the power profiler 2. The previous setting signal of 18° C. is currently applied to input 10 of the controller 16.

Before the first iteration within the loop shown in FIG. 12, the algorithm compares the new setting signal 20° C. to the previous setting signal of 18° C., sets a variable called new requested setting signal to 1, memorizes it and calculates the time T1 at which the temperature of the area should reach the value of 20° C., T1=actual time+delay=01 hr:30 min PM+4 hr=05 hr:30 min PM.

As the variable called new requested setting signal has been set to 1, the response to the question step 39 is yes. Then the algorithm calculates the time T2 at which the power profiler 2 must take control of the amount of power supplied to the heating device 26, T2=T1−ΔT=05 hr:30 min PM−01 hr:08 min=04 hr:22 min PM, the value of ΔT being the last value thereof evaluated and memorized during the precedent execution of the algorithm, or, if this is the first execution of the program, memorized during the initialization of the system.

The responses to question steps 41 and 13 are respectively no and yes because it is not the time yet to start the power profiler 2 and the current mode is 1. Then the value A is compared with a tolerance value TOL of 0,5° C., A>0,5° C.=?, to see whether a temperature raise has been requested, by means of question step 15. As A has a value of 0, the response is no. The value A is also compared with the tolerance value TOL, A<0,5° C=?, to see whether a temperature drop has been requested, by means of question step 17. As A has a value of 0, the response is still no. Then, the command signal applied to input 10 of the controller 16 is maintained to 100% and the value of A is maintained to 0. This terminates the first iteration of the loop. A new iteration of the loop is started every 10 s.

For the second iteration, the responses to question steps of 11, 39, 41, 13, 15 and 17 are respectively no, yes, no, yes, no and no. The results of the calculations performed in this second iteration are the same as those obtained during the first iteration. The same results will be obtained for the next iterations until the 1212th iteration.

For the 1212th iteration which is obtained at a time of 04 hr:22 min PM plus a few seconds, the responses to question steps 11 and 39 are still no and yes but the response to question step 41 is now yes because the time at which the power profiler 2 should be started, 04 hr:22 min:00 s PM, is now smaller than the actual time 04 hr:22 min: 03 s PM. Then the variable called new requested setting signal is set to 0, the variable A is calculated by means of the equation: A=new setting signal−actual temperature=(20° C.−18,3° C.)=+1,7° C., and the mode is set to 1. All of these variables are stored.

The response to question step 13 is yes as the mode has been set to 1. Then, the algorithm determines whether the new setting signal means a temperature raise or a temperature drop. The algorithm compares the value A which is +1,7° C. to a tolerance value which is 0,5° C., A>0,5° C.=?. As the result of the comparison is positive, the response to question step 15 is yes. But if the response had been no, the algorithm tests by means of question step 17 whether a temperature drop is requested by the occupant.

As the response to question step 13 is yes, the mode is set to 3 and memorized. The time period ΔT, the uniform amount of power to be supplied and the time-related upper and lower limit profiles HLV(t) and LLV(t) are determined by the power profiler 2. The power profiler 2 takes over the control of the output signal sent to the power regulator 22 by controlling inputs 10 and 14 of the controller 16. The calculation of the uniform amount of power is done by the following equation: (minimum(maximum (previous command %+gain*A), minimal command), maximum command))=(minimum(maximum (34%+18,8%° C.*1,7° C.),0%), 100%)=66%. This means that the uniform amount of power is 66% of the available maximum power. This value of 66% is applied to input 14 of the controller 16. The gain 18,8%/° C. is read from the RAM memory and is regularly adjusted every time the algorithm is executed by means of the learning for adjusting steps.

As mentioned above, the value of ΔT is the last value thereof evaluated and memorized during the precedent execution of the algorithm. The calculation of ΔT will be described later on. In this case, the occupant decided that time period ΔT be deferred so that the desired temperature be obtained later on at 5 hr:30 min PM. As shown in FIG. 8, the lower limit profile LLV(t) has a slope. This slope is determined by the following equation: (A+tolerance)/ΔT= (1,7° C.+0,5° C.)/3600 s=0,000611° C./s. As also shown in FIG. 8, the upper limit profile HTV(t) is a constant equal to 20,0° C. The 1212th iteration of the loop is now terminated. The uniform amount of power supplied to the heating device 26 is 66% of the available maximum power.

During the 1213th iteration, the responses to question steps 11, 39, 13, 19 and 21 are respectively no, no, no, no and yes because the mode has been set to 3 which indicates that a raise was requested by the occupant. We will describe the steps that are performed when the mode is set to 3 but one will understand that analogue steps as shown in FIG. 12 are performed when a temperature drop is requested by the occupant and the mode is set to 2.

The algorithm monitors the actual temperature in view of the upper and lower limit profiles HLV(t) and LLV(t) by means of question steps 23 and 25 to detect when the actual temperature reaches one of the limit profiles HLV(t) and LLV(t). This part of the algorithm is similar to the corresponding part of the algorithm shown in FIG. 6. The algorithm will test the actual temperature with respect to the lower and upper limit profiles LLV(t) and HLV(t) every 10 s and responses to question steps 23 and 25 will be no and no until the 1249th iteration.

At the beginning of the 1249th iteration, the actual time is 4 hr:58 min PM, the actual temperature is 20,10° C. and the mode is still set to 3. The calculation of the lower limit profile LLV(t) is now (20° C.−(5 hr:30 min PM−4 hr:58 min PM)*0,000611° C./s)=18,84° C. The upper limit profile HLV(t) is 20° C. The actual temperature 20,10° C. is now higher than the upper limit profile, then the response to the question step 25 is yes. Then, the mode is set to 4 and memorized. The amount of power supplied to the heating device 26 is controlled to cause the actual temperature to follow substantially the upper limit profile HLV(t) for the remaining portion of the time period ΔT, which is until 5 hr:30 min PM. In practice, the control of the amount of power supplied to the heating device 26 is now returned to the controller 16. The command signal sent to input 14 of the controller 16 is set to 100%, and the signal sent to input 10 of the controller 16 is set to 20° C. so that the actual temperature will follow substantially the upper limit profile HLV(t) as shown in the lower diagram of FIG. 8. Also, the estimation of the power command error is initialized to 0,0 s. At the end of this iteration, the measured temperature and the actual amount of power supplied to the heating device are respectively 20,1° C. and 83% of the maximum amount of power.

During the 1250th iteration, as the mode has been set to 4, the response to question step 27 is yes and the algorithm enters the learning for adjusting steps shown in the lower part of FIG. 12. The algorithm integrates the power command error by calculating the following equation: power command error=previous power command error+(the actual amount of power supplied to the heating device 26−the uniform amount of power previously calculated)*one time step=0,0% s+(83%−66%)*10 s. The result of this equation is 170,0% s.

Then, the algorithm tests the actual time, 4 hr:59 min:14 s PM, with respect to the time limit of 5 hr:30 min PM by means of question step 29. At this time, the time limit of 5 hr:30 min PM has not been reached yet. The setting signal sent from output 4 of the power profiler 2 to input 10 of the controller 16 is calculated by means of the following equation: setting signal=previous setting signal−(time limit−actual time)* slope of the upper limit profile HLV(t)=20° C.−(5 hr:30 min PM−4 hr:59 min:14 s PM)*0,000000° C./s=20,00° C. This iteration is now terminated.

In the following iterations, the setting signal applied to input 10 of the controller 2 is maintained to 20° C. The 1440th iteration will occur at 5 hr:30 min: 08 s.

During the 1440th iteration, the mode is still set to 4 and the power command error=−7680% s+(44%−66%)* 10 s=−7900% s. As the actual time 5 hr:30 min:08 s PM is now later than the time limit 5 hr:30 min PM, the response to question step 29 is yes. Then, the mode is set to 1 and memorized. The controller 16 is returned to its normal operation mode by applying a 100% signal to its input 14, and by applying a fixed signal of 20° C. to its input 10. The gain of the algorithm is updated and improved by means of the power command error. The updated gain=minimum (maximum (previous gain−(power command error/ (ΔT*A))* predetermined gain+(setting signal−actual temperature)*((previous gain*predetermined gain)/A); minimum gain of the algorithm), maximum gain of the algorithm)=minimum (maximum (18,8%/° C.−(7900% s/(4080 s *1,7° C.))*2+(20° C.−20.1° C.)*((18,8%/° C.*2)/ 1.7° C.); 10%/° C.); 100%/° C.)=14,3%/° C. The predetermined gain is a stored variable having a value of 2 determined by previous experimentations. The minimum and maximum gains of the algorithm are predetermined stored variables. The updated gain value of 14,3%/° C. is memorized. The variable A is set to 0.

Also in this iteration, the time period ΔT is updated in view of certain results of the present execution of the algorithm, according to the following equation: updated time period ΔT=minimum(maximum(previous time period ΔT-fraction of desired available command*available power-absolute value of( uniform amount of power-previous command))*predetermined gain of the algorithm regarding time; minimum time period ΔT); maximum time period ΔT)=minimum(maximum(01 hr:08 min-(0.5*66%-absolute value of (66%-34%))*18 s%; 00 hr:30 min); 01 hr:30 min)=01 hr:07 min:42 s. The fraction of desired available command, the predetermined gain of the algorithm regarding time and the minimum and maximum time periods ΔT are predetermined stored variables. This iteration is now terminated.

After the 1440th iteration, the setting signal sent to input 10 of the controller 16 is 20° C., the controller 16 regulates the temperature within the room in view of this setting signal of 20° C. The signal sent from output 8 to input 14 of the controller 16 is set to 100% to allow a wide operating range for the controller 16. The setting signal set by the occupant is monitored every 10 s.

We will now present, as preferred embodiments, different softwares that can be used for implementing the present invention. All of these softwares are in HP BASIC 6.2 code.

The next software is implemented in the power profiler 2 shown in FIGS. 2 and 7 to realize exponential filtering that is used for filtering signals received at inputs 34 and 38:

```
24240 !
24250 SUB Fltr_cmde(REAL Entree,Sortie)
24330 COM /Fltr_cmde_mem/ REAL Mem,INTEGER Etat
24340 COM /Fltr_cmde_btn/ REAL X
24350 IF NOT (Etat) THEN
24360 Mem=Eritree
24380 Etat=1
24390 ELSE
24400 Mem=X*Entree+(1.-X)*Mem
24420 END IF
24430 Sortie=Mem
24440 SUBEND
24450 !
24460 SUB Fltr_cmde_dft
24510 COM /Fltr_cmde_Tflem/ REAL Mem,INTEGER Etat
24520 COM /Fltr_cmde_btn/ REAL X
24540 X=1.-EXP(-10/(20.*60.))
24560 Etat=0
24570 SUBEND
24580 !
```

The next software is implemented in the power profiler 2 in the embodiment shown in FIG. 2 where the controller is integrated, the time period ΔT is fixed, and the temperature can be raised or dropped in a controlled manner:

```
22380 !
22390 SUB Algo (REAL
Csgn_entree,Mes_entree,Cmde_entree, Csgn_sortie1
Cmde_sortie,INTEGER Ctl_en_sortie)
22780 COM/Algo_mem/REAL
Tmps_fin, Tmps,Dcsgn, Csgn,Dcsgn_dt, Cmde,Ua, Som_err, INTEGER
Mode, Apprentissage
22790 COM/Algo_btn/REAL
Duree,Csgn_tol,Csgn_min,Csgn_Gain_algo,Ua_min,
Ua_max,Cmde_min,Cmde_max
22800 REAL Tempo
22810 Tempo=Csgn
22820 Csgn=MAX (Csgn_min,MIN (Csgn_max, Csgn_entree))
22830 Tempo=Csgn_Tempo
22840 IF Tempo THEN
22850 Mode=1
22860 Dcsgn=Csgn-Mes_entree
22870 END IF
22880 SELECT Mode
22890 CASE 1
22900 SELECT Dcsgn
22910 CASE >=Csgn_tol
22920 Mode=3
22930 Dcsgn_dt=(Dcsgn+Csgn_tol)/Duree
22940 Ctl_en_sortie=0
22950 CASE <=(-Csgn_t91)
22960 Mode=2
22970 Dcsgn_dt=(Dcsgn-Csgn_tol) /Duree
22980 Ctlen_sortie=Q
22990 CASE ELSE
22991 Dcsgn=0.
23000 Dcsgn_dt=0.
23010 Ctl_en_sQrtie=1
23020 END SELECT
```

-continued

```
23030 Tmps_f in=TIMEDATE+Duree
23040 Tempo=Cmde_entree+Ua*(Csgn_Mes_entree)
23050 Cmde=MIN(Cmde_max,MAX(Cmde_min,Tempo))
23060 IF Cmde=Tempo THEN
23070 Apprentissage=1
23080 ELSE
23090 Apprentissage=0
23100 END IF
23110 Csgn_sortie=Csgn
23120 CASE 2
23130 IF Mes_entree<=Csgn THEN
23141 Dcsgn_dt=0.
23150 Mode=4
23160 Ctl_en_sortie=1
23170 Csgn_sortie=Csgn
23180 ELSE
23190 Tempo=Csgn_Dcsgn_dt* (Tmps_f in-TIMEDATE)
23200 IF Mes_entree>=Tempo THEN
23210 Mode=4
23220 Ctl_en_sortie=1
23230 Csgn_sortie=Tempo
23240 ELSE
23250 Ctl_en_sortie=0
23260 Csgn_sortie=Csgn
23270 END IF
23280 END IF
23281 Som_err=0.
23282 Tmps=TIMEDATE
23390 CASE 3
23400 IF Mes_entree>=Csgn THEN
23410 Mode=4
23411 Dcsgn_dt=0.
23420 Ctl_en_sortie=1
23430 Csgn_sortie=Csgn
23440 ELSE
23450 Tempo=Csgn-Dcsgn_dt*(Tmps_fin-TIMEDATE)
23460 IF Mes_entree<=Tempo THEN
23470 Mode=4
23480 Ctl_en_sortie=1
23490 Csgn_sortie=Tempo
23500 ELSE
23510 Ctl_en_sortie=0
23520 Csgn_sortie=Csgn
23530 END IF
23540 END IF
23550 Som_err=0.
23560 Tmps=TIMEDATE
23710 CASE 4
23720 Tempo=Tmps
23730 Tmps=TIMEDATE
23740 Som err=Som_err+(Cmde_entree_Cmde)*(Tmps_Tempo)
237S0 IF Tmps>Tmps_fin THEN
23760 IF Apprentissage THEN
Ua=MIN (Ua_max,MAX (Ua_min, Ua+Gain_algo*5om_err/Duree/Dcsg
n))
23780 Mode=1
23790 Dcsgn=0.
23791 Dcsgn_dt=o.
23800 END IF
23810 Ctl_en_sortie=1
23820 Csgn_sortie=Csgn-Dcsgn_dt*(Tmps_fin-Tmps)
23830 END SELECT
23850 Cmde_sortie=Cmde
23860 SUBEND
23870 !
23880 SUB Algo_dft
23940 COM/Algo - mem REAL
Tmps_fin, Tmps,Dcsgn, Csgn,Dcsgn_dt, Cmde, Ua, Som_err, INTEGER
Mode,Apprtsg
23950 COM /Algo - btn REAL
Duree, Csgn_tol, Csgn_min, Csgn_max,Gain_algo,Ua_min,tja_max,
Cmde_min,Cmde_max
23970 IF NOT (Ua) THEN Ua=.3
23980 Mode=1
23990 Duree=3600.
24000 Csgn_tol=.5
24010 Csgn_min=5.
24020 Csgn_max=27.
24030 Gain_algo=2.
```

-continued

```
24040 Ua_min=.05
24050 Ua_max=1.
24060 Cmde_min=0.0
24070 Cmde_max=1.0
24080 SUBEND
24090 !
   The next software is implemented in the power
profiler 2 in the embodiment shown in FIG. 2 where the
controller is integrated, the time period ΔT is fixed, and
the temperature can only be raised in a controlled manner:
22380 !
22390 SUB Algo (REAL
Csgn_entree, Mes_entree, Cmde_entree, Csgn_sortie, Cmde_sort
ie,INTEGER Ctl_en sortie)
22780 COM/Algo - mem REAL
Tmps_fin, Tmps,Dcsgn, Csgn, Dcsgn_dt, Cmde,Ua, Som err, INTEGER
Mode,Apprentissage
22790 COM/Algo - btn/REAL
Duree, Csgn_tol, Csgn min,Csgn_max,_j_algo,Ua_min1
Ua_max,Cmde_min,Cn_de_max
22800 REAL Tempo
22810 Tempo=Csgn
22820 Csgn=MAX (Csgn_min,MIN(Csgn_max, Csgn_entree))
22830 Tempo=Csgn_Tempo
22840 IF Tempo THEN
22850 Mode=1
22860 Dcsgn=Csgn-Mes_entree
22870 END IF
22880 SELECT Mode
22890 CASE 1
22900 SELECT Dcsgn
22910 CASE >=Csgn_tol
22920 Mode=3
22930 Dcsgn_dt=(Dcsgn+Csgn_tol)/Duree
22940 Ctl_en_sortie=0
22990 CASE ELSE
22991 Dcsgn=o.
23000 Dcsgn_dt=0.
23010 Ctl_en_sortie=1
23020 END SELECT
23030 Tmps_fin=TIMEDATE+Duree
23040 Tempo=Cmde_entree+Ua*(Csgn_Me5_entree)
23050 Cmde=MIN(Cmde_max,MAX(Cmde_min,Tempo))
23060 IF Cmde=Tempo THEN
23070 Apprentissage=1
23080 ELSE
23090 Apprentissage=o
23100 END IF
23110 Csgn_sortie=Csgn
23390 CASE 3
23400 IF Mes_entree>=Csgn THEN
23410 Mode=4
23411 Dcsgn_dt=o.
23420 Ct1 en_sortie=i
23430 Csgn_sortie=Csgn
23440 ELSE
23450 Tempo=Csgn-Dcsgn_dt* (Tmps fin-TIMEDATE)
23460 IF Mes_entree<=Tempo THEN
23470 Mode=4
23480 Ctl_en_sortie=1
23490 Csgn_sortie=Tempo
23500 ELSE
23510 Ctl_en_sortie=0
23520 Csgn_sortie=Csgn
23530 END IF
23540 END IF
23550 Som_err=0.
23560 Tmps=TIMEDATE
23710 CASE 4
23720 Tempo=Tmps
23730 Tmps=TIMEDATE
23740 Som_err=Som_err+(Cmde_entree_Cmde)*(Tmps_Tempo)
23750 IF Tmps>Tmps_fin THEN
23760 IF Apprentissage THEN Ua=MIN(Ua_max,MAx
(Ua_min,Ua+Gain_algo*Som_err/Duree/Dcsgn))
23780 Mode=1
23790 Dcsgn=0.
23791 Dcsgn_dt=0.
23800 END IF
```

-continued

```
23810 Ctl_en_sortie=1
23820 Csgn_sortie=Csgn_Dcsgn_dt*(Tmps_fin_Tmps)
23830 END SELECT
23850 Cmde_sortie=Cmde
23860 SUBEND
```
The next software is implemented in the controller 16 in the embodiment shown in FIG. 2 where the controller 16 is integrated:
```
21440 SUB Pid (REAL
Csgn_entree,Mes entree, Cmde_entree1Cmde_s6rtie, INTEGER
Ctl_en_entree)
21710 COM /Pid_mem/ REAL Erreur,Som_err1Cmde,INTEGER
Etat
21720 COM/Pid_btn/REAL
Gain,Inv_ti,T_d,Csgn_min,Csgn_max
21730 REAL Tempo
21740 IF NOT (Ctl_en_entree) THEN
21750 Etat=0
21760 Cmde_sortie=Cmde_entree
21770 ELSE
21780 Tempo=Erreur
21790
Erreur=Gain* (MIN(Csgn___,MAX(Csgn_min,Csgn_entree)) -
Mes_entree)
21840 IF NOT (Etat) THEN
21850 Etat=1
21860 Som_err=Cmde
21870 Cmde sortie=Erreur+Som_err
21880 ELSE
21890 Som_err=MIN(1. ,MAX(O. ,Som_err+Inv_ti*Erreur))
21900 Cmde_sortie=Erreur+Som_err+T_d*(Erreur-Tempo)
21920 END IF
21940 END IF
21950 Cmde_sortie=MIN(1.,MAX(O_Cmde_sortie))
21960 Ctnde=Cmde_sortie
21970 SUBEND
21980 !
21990 SUB Pid_dft
22040 COM/Pid_btn/REAL
Gain,Inv_ti,T_d,Csgn_min,Csgn_Tna
22050 IF NOT Gain THEN
22060 Gain=1./1.8
22070 T_d=.2
22080 Inv_ti=.02
22090 Csgn_min=5.
22100 Csgn_max=27.
22120 END IF
22130 SUBEND
22140 !
```
The next software is implemented in the power profiler 2 in the embodiment shown in FIG. 7 where the controller is not integrated, the time period AT can be modified, and the temperature can be raised or dropped in a controlled manner:
```
3180 SUB Algo (REAL
Mes_in,Cmde_in,Csgn_out,Cmde_max_out,OPTIONAL REAL
Csgn_in,Delais_in)
3680 COM/Algo - mem/REAL
Tmps _fin, Tmps, Dp_dspn, Dcsgn, Csgn, Csgn_avnt,
Dcsgn_dt,Cmde_algo,Som_err,Csgn delais,Tmps fin delais,U
a,Duree,INTEGER Mode,Delais_en
3690 COM/Algo_dft/REAL
Duree_max, Duree _min, Dp_dspn_min, Frc_dp_dspn,
Dp_gain, Csgn_tol, Csgn_min., Csgn_max, G_algo, Ua_min,Ua max
3700 REAL Tempo,Err_ua
3710 !
3730 IF NPAR>4 THEN
3740 Csgn_delais=MAX(Csgn_min,MIN(Csgn_max, Csgn_in))
3750 Delais en=1
3760 IF NPAR>5 THEN
3770 IF Csgn_delais<Csgn THEN
3780 Tmps_fin_delais=FNTdate+Delais in+Duree
3790 ELSE
3800 Tmps_fin_delais=FNTdate+Delais in
3810 END IF
3820 ELSE
3830 Tmps_fin_delais=FNTdate
3840 END IF
3850 END IF
```

-continued

```
3860 !
3880 IF Delais_en THEN
3890 IF (Tmps_fin_delais-Duree)<=FNTdate THEN
3900 Tmps_fin=FNTdate+Duree
3910 Mode=1
3920 Dcsgn=Csgn_delais-Mes in
3930 Csgn_avnt=Csgn
3940 Csgn=Csgn_delais
3950 Delais_en=0
3960 END IF
3970 END IF
3980
4000 SELECT Mode
4010 CASE 1
4020 Dcsgn_dt=0.
4030 Cmde_max_out=1.
4040 Csgn_out=Csgn
4050 SELECT Dcsgn
4060 CASE >=Csgn_tol
4070 Dp_dspn=1. -Cmde_in
4080 IF Dp_dspn>=Dp_dspn_min THEN
4090 Mode=3
4100 Dcsgn_dt=(Dcsgn+Csgn_tol) /Duree
4110 Cmde_algo=MIN(1. ,MAX(O. ,Ua*Dcsgn+Cmde in))
4120 Cmde_max_out=Cmde_algo
4130 ELSE
4140 Dcsgn=0.
4150 END IF
4160 CASE <=(-Csgn_tol)
4170 Dp_dspn=Cmde_in
4180 IF Dp_dspn>=Dp_dspn_min THEN
4190 Mode=2
4200 Dcsgfl_dt=(Dcsgfl-Csgfl_tcl) /Duree
4210 Cmde_algo=MIN(1. _MAX(9. ,Ua*Dcsgfl+Cmde_ifl))
4220 Cmde_max_out=Cmde_algo
4230 Csgn_out=Csgfl_avflt
4240 ELSE
4250 Dcsgfl=0.
4260 END IF
4270 CASE ELSE
4280 Dcsgfl=0.
4290 END SELECT
4300 CASE 2
4310 IF Mes_jfl<=Csgfl THEN
4320 Dcsgfl_dt=0.
4330 Mo_e=4
4340 Cmde_max_out=1.
4350 Csgfl_out=Csgfl
4360 ELSE
4370 Tempo=Csgfl_Dcsgfl_dt* (TmpsLf ifl-FNTdate)
4380 IF Mes_ifl_=Tempo THEN
4390 Mode=4
4400 Cmde_max_out=1.
4410 Csgfl_out =Tempo
4420 ELSE
4430 Cmde_rtiax_out=Cmde_algo
4440 Csgn_out=Csgfl_avflt
4450 END IF
4460 END IF
4470 Som_err=0.
4480 Tmps=FNTdate
4490 CASE 3
4500 IF Mes_ifl>=Csgfl THEN
4510 Dcsgfl_dt=0.
4520 Mode=4
4530 Cmde_max out=1.
4540 Csgn_out=Csgn
4550 ELSE
4560 Tempo=Csgn-Dcsgn_dt* (Tmps_fin-FNTdate)
4570 IF Mes_*in<=Tempo_THEN
4580 Mode=4
4590 Csgn_out=Tempo
4600 Cmde_max_out=1.
4610 ELSE
4620 Csgn_out=Csgn
4630 Cmde_max_out=Cmde_algo
4640 END IF
4650 END IF
4660 Som_err=0.
```

-continued

```
4670 Tmps=FNTdate
4680 CASE 4
4690 Tempo=Tmps
4700 Tmps=FNTdate
4710 Som_err=Som_err+(Cmde_in_Cmde_algo)*(Tmps_Tempo)
4720 IF Tmps>=Tmps_fin THEN
4740 Err_ua=G_algo*(Som_err/Duree+(Csgn-Mes_in)*Ua)/Dcsgn
4750 Tempo=Ua*ABS (Dcsgn)
4760 IF Err_ua>0. THEN
4770 IF Dp_dspn>Tempo THEN
Ua=MIN(Ua_max,MAX(Ua_min,Ua+Err_ua))
4780 ELSE
4790 Ua=MIN(Ua_max,MAX(Ua_min,Ua+Err_ua))
4800 END IF
4820 Tempo=MIN (Dp_dspn, Tempo)
4830 Duree=MAX(Duree_min,MIN(Duree_max,Dp_gain* (Tempo-
Frc_dp_dspn*Dp_dspn) +Duree))
4850 PRINT "SUB Algo: UA=";PROUND(Ua,-
2),"Duree=";INT(Duree) ,DATE$ (FNTdate);"";TIME$ (FNTdate)
4890 Csgn_out=Csgn
4900 Mode=1
4910 Dcsgn=0.
4920 ELSE
4930 Csgn_out=csgn_Dcsgn_dt* (Tmps_fin-Tmps)
4940 END IF
4950 Cmde_max_out=1.
4960 END SELECT
4970 SUBEND
4990 SUB Algo_dft(REAL Csgn_in)
5070 COM/Algo_mem REAL
Tmps _fin, Tmps., Dp_dspn, Dcsgn, Csgn, Csgn_avnt,
Dcsgn_dt,Cmde_algo,Som_err,Csgn_delais,Tmps_fin_delais,U
a,Duree,INTEGER Mode,Delais_en
5080 COM /Algo_dft/REAL
Duree_max, Duree_min, Dp_dspn_min, Frc_dp_dspn, Dp_gain, Csgn
_tol,Csgn_min,Csgn_max,G_algo,Ua min,Ua_max
5130 IF NOT (Ua) THEN Ua=.3
5140 IF NOT Duree THEN Duree=3600.
5150 Mode=1
5160 Csgn=Csgn_in
5170 Csgn_avnt=Csgn
5180 Dcsgn=0.
5200 Duree max=10800.
5210 Duree min=1800.
5220 Dp_dspn_min=. 1
5230 Frc_dp_dspn=.5
5240 Dp_gain=Duree_max*.1
5250 Csgn_tol=1.0
5260 Csgn_min=5.
5270 Csgn_max=27.
5280 G_algo=1.
5290 Ua_min=.1
5300 Ua_max=1.
5310 SUBEND
```

The next software is implemented in the power profiler 2 in the embodiment shown in FIG. 7 where the controller is not integrated, the time period AT can be modified, and the temperature can only be raised in a controlled manner:

```
3180 SUB Algo (REAL
Mes_in,Cmde_in,Csgn_out,Cmde_max_out,OPTIONAL REAL
Csgn_in,Delais_in)
3680 COM/Algo_mem REAL
Tmps _fin, Tmps , Dp_dspn, Dcsgn, Csgn, Csgn _avnt
Dcsgn_dt,Cmde_algo,Som_err,Csgn_delais,Tmps_fin delais,U
a,Duree,INTEGER Mode,Delais_en
3690 COM/Algo_dft/REAL
Duree _max, Duree _min, Dp_dspn_min, Frc _dp_dspn,
Dp_gain,Csgn_tol,Csgn_min,Csgn_max,G_algo,Ua_min,Ua_max
3700 REAL Tempo,Err_ua
3710 !
3730 IF NPAR>4 THEN
3740 Csgn_delais=MAX(Csgn_min,MIN(Csgn_max,Csgn in))
3750 Delais_en=1
3760 IF NPAR>5 THEN
3770 IF Csgn_delais<Csgn THEN
3780 Tmps_fin_delais=FNTdate+Delais in+Duree
3790 ELSE
3800 Tmps_fin_delais=FNTdate+Delais in
```

-continued

```
3810 END IF
3820 ELSE
3830 Tmps_fin delais=FNTdate
3840 END IF
3850 END IF
3860 !
3880 IF Delais_en THEN
3890 IF (Tmps_fin_delais-Duree)<=FNTdate THEN
3900 Tmps_fin=FNTdate+Duree
3910 Mode=1
3920 Dcsgn=Csgn_delais-Mes_in
3930 Csgn_avnt=Csgn
3940 Csgn=Csgn_delais
3950 Delais_en=0
3960 END IF
3970 END IF
3980
4000 SELECT Mode
4010 CASE 1
4020 Dcsgn_dt=0.
4030 Cmde_max_out=1.
4040 Csgn_out=Csgn
4050 SELECT Dcsgn
4060 CASE >=Csgn_tol
4070 Dp_dspn=1. -Cmde_in
4080 IF Dp_dspn>=Dp_dspn_rain THEN
4090 Mode=3
4100 Dcsgn_dt=(Dcsgn+Csgn_tol) /Duree
4110 Cmde_algo=MIN(1. ,MAx(O. 1Ua*Dcsgn+Cmde in))
4120 Cmde_max_out=Cmde_algo
4130 ELSE
4140 Dcsgn=0.
4150 END IF
4270 CASE ELSE
4280 Dcsgn=0.
4290 END SELECT
4490 CASE 3
4500 IF Mes in_=Csgn THEN
4510 Dcsgn_dt=0.
4520 Mode=4
4530 Cmde_max_out=1.
4540 Csgn_out=Csgn
4550 ELSE
4560 (Tmps_fin-FNTdate)
4570 IF Mes in<=Tempo THEN
4580 Mode=4
4590 Csgn_out=Tempo
4606 Cmde_max_out=1.
4610 ELSE
4620 Csgn_out=Csgn
4630 Cmde_max_out=Cmde_algo
4646 END IF
4650 END IF
4660 Som_err=0.
4670 Tmps=FNTdate
4680 CASE 4
4690 Tempo=Tmps
4700 Tmps=FNTdate
471Q Som_err=Som_err+(Cmde_in-Cmde_algo)*(Tmps_Tempo)
4720 IF Tmps>=Tmps_fin THEN
4740 Err_ua=G_algo*(Som_err/Duree+(Csgn-Mes_in)*Ua)/Dcsgn
4750 Tempo=Ua*ABS(Dcsgn)
4760 IF Err_ua>0. THEN
4770 IF Dp_dspn>Tempo THEN
Ua=MIN(Ua_max,MAX(Ua_min,Ua+Err_ua))
4780 ELSE
4790 Ua=MIN(Ua_max,MAX(Ua_min,Ua+Err_ua))
4800 END IF
4820 Tempo=MIN(Dp_dspn,Tempo)
4830 Duree=MAX(Duree_min,MIN(Duree_max,Dp_gain* (Tempo-
Frc_dp_dspn*Dp_dspn) +Duree))
4840 Temporaire
4850 PRINT "SUB Algo: UA=";PROUND(Ua, -
2), "Duree="; INT(Duree), DATE$ (FNTdate);"";TIME$ (FNTdate)
4890 Csgn_out=Csgn
4900 Mode=1
4910 Dcsgn=0.
4920 ELSE
4930 Csgn_out=Csgn_Dcsgn_dt* (Ttnps_fin-Tmps)
```

```
-continued
4940 END IF
4950 Cmde_max_out=1.
4960 END SELECT
4970 SUBEND
4990 SUB Algo_dft(REAL Csgn_in)
5070 COM/Algo_mem REAL
Tmps_fin,Tmps,Dp_dspn,Dcsgn,Csgn1Csgn_avnt,
Dcsgn_dt,Cmde_algo,Som_err,Csgn_delais,Tmps fin delais,U
a,Duree,INTEGER Mode,Delais_en
5080 COM/Algo_dft/REAL
Duree _max,Duree _min,Dp_dspn_min, Frc_dp_dspn,
Dp_gain,Csgn_tol, Csgn_min,Csgn_max,G_algo,Ua_min,Ua max
5130 IF NOT (Ua) THEN Ua=.3
5140 IF NOT Duree THEN Duree=3600.
5150 Mode=1
5160 Csgn=Csgn_in
5170 Csgn_avnt=Csgn
5180 Dcsgn=0.
5200 Duree_max=10800.
5210 Duree_min=1800.
5220 Dp_dspn min=.1
5230 Frc_dp_dspn=.S
5240 Dp_gain=Duree_max*.1
5250 Csgn_tol=1.0
5260 Csgn_min=5.
5270 Csgn_max=27
5280 G_algo=1.
5290 Ua_min=.1
5300 Ua_max=1.
5310 SUBEND
```

Although the present invention has been explained hereinabove by way of preferred embodiments thereof, it should be pointed out that any modifications to these preferred embodiments, within the scope of the appended claims is not deemed to change or alter the nature and scope of the present invention.

What is claimed is:

1. A method for controlling an amount of power supplied to a conditioning device acting on an actual value of a predetermined physical parameter within an area in relation to a setting signal, the method comprising steps of:

(a) monitoring the setting signal to detect a change thereof;

(b) if the monitoring of step (a) fails to detect the change of the setting signal, controlling the amount of power supplied to the conditioning device to maintain the actual value of the predetermined physical parameter within a range of desired values determined by the setting signal, and returning to step (a); and (c) if the monitoring of step (a) detects a changed setting signal:

(i) determining a time period and a uniform amount of power required by the conditioning device to cause the actual value of the predetermined physical parameter to theoretically reach a new range of desired values corresponding to the changed setting signal;

(ii) establishing time-related upper and lower limit profiles HLV(t) and LLV(t) of the predetermined physical parameter for the time period determined in step (i), the upper and lower limit profiles HLV(t) and LLV(t) having respectively different starting values and converging toward the new range of desired values at an end of the time period, the actual value of the predetermined physical parameter being included in a range delimited by the starting values;

(iii) supplying the uniform amount of power determined in step (i) to the conditioning device;

(iv) monitoring the actual value of the predetermined physical parameter during the time period in view of the upper and lower limit profiles HLV(t) and LLV(t) to detect when the actual value of the predetermined physical parameter reaches one of the limit profiles HLV(t) and LLV(t);

(v) when the actual value of the predetermined physical parameter reaches one of the limit profiles HLV(t) and LLV(t), controlling the amount of power supplied to the conditioning device to cause the actual value of the predetermined physical parameter to follow substantially the limit profile HLV(t) or LLV (t) that has been reached for a remaining portion of the time period; and (vi) monitoring time from a beginning of the time period and when the time period ends returning to step (a).

2. The method according to claim 1, wherein:

step (v) further comprises a step of estimating a power command error of the uniform amount of power determined in step (i) by integrating, over the remaining portion of the time period, a difference between the amount of power supplied to the conditioning device during said remaining portion of the time period and the uniform amount of power determined in step (i); and when a next changed setting signal is detected, the uniform amount is determined in step (i) by taking into account the power command error.

3. The method according to claim 2, wherein:

the range of desired values is limited to a single desired value;

the amount of power supplied to the conditioning device is limited to a maximum power amount; and in step (i), the uniform amount of power is determined by steps of:

calculating a value A where A=(the single desired value−the actual value);

measuring an actual amount of power supplied to the conditioning device, and calculating a first percentage of the maximum power amount that represents the actual amount; and calculating a second percentage of the maximum power amount where the second percentage=(the first percentage+(A*the power command error)), the uniform amount of power being determined as the second percentage of the maximum power;

in step (ii), the time-related upper and lower limit profiles HLV(t) and LLV(t) are established by steps of:

determining whether the value A is positive or negative;

if the value A is positive, which means that the actual value of the predetermined physical parameter has to be raised, establishing:

the lower limit profile LLV(t) of step (ii) by means of the following equation: LLV(t)=the single desired value−((the time period−Δt)*(A+a predetermined tolerance margin)/the time period), Δt representing time elapsed since the beginning of the time period; and the upper limit profile HLV(t) of step (ii) by means of the following equation: HLV(t)=the single desired value; and if the value A is negative, which means that the actual value of the predetermined physical parameter has to be lowered, establishing:

the upper limit profile HLV(t) of step (ii) by means of the following equation: HLV(t)=the single desired value−((the time period−Δt)*(A−a predetermined tolerance margin)/the time period); and the lower limit profile LLV(t) of step (ii) by means of the following equation: LLV(t)=the single desired value.

4. The method according to claim 3, wherein:

the physical parameter is temperature;

the conditioning device is a heating device; and in the step (i), the time period is a predetermined fixed time period.

5. The method according to claim 3, wherein:

the physical parameter is temperature;

the conditioning device is a heating device; and the amount of power supplied to the conditioning device is limited to a maximum amount of power; and in step (i), when a first changed setting signal is detected, the time period is determined in relation to a predetermined initialization value, and for each subsequent changed setting signal that is detected, the time period is upgraded by means of the following steps:

calculating the following equation:

the time period=a precedent time period+a gain*(a previous amount of power determined in step (i)−a predetermined fraction of the maximum power amount), where the gain and the predetermined fraction are fixed values determined by previous experimentations; and comparing the time period with a range of acceptable time periods, if the time period is within the range of acceptable time periods then the time period is used, otherwise the time period is set to a closest value within the range of acceptable time periods.

6. The method according to claim 1, wherein, in the step (i), the time period is a predetermined fixed time period.

7. The method according to claim 1, wherein:

the amount of power supplied to the conditioning device is limited to a maximum amount of power; and in step (i), when a first changed setting signal is detected, the time period is determined in relation to a predetermined initialization value, and for each subsequent changed setting signal that is detected, the time period is upgraded by means of the following steps:

calculating the following equation:

the time period=a precedent time period+a gain*(a previous amount of power determined in step (i)−a predetermined fraction of the maximum power amount), where the gain and the predetermined fraction are fixed values determined by previous experimentations; and comparing the time period with a range of acceptable time periods, if the time period is within the range of acceptable time periods then the time period is used, otherwise the time period is set to a closest value within the range of acceptable time periods.

8. The method according to claim 1, wherein the physical parameter is temperature, and the conditioning device is a heating device.

9. The method according to claim 1, wherein:

the steps (iii), (iv), (v) and (vi) are deferred at a time T1 to obtain the new range of desired values at a predetermined time T2, T1 being equal to T2 minus the time period; and the controlling of the step (b) is performed as long as steps (iii), (iv), (v) and (vi) are deferred.

10. An apparatus for controlling an amount of power supplied to a conditioning device acting on an actual value of a predetermined physical parameter within an area in relation to a setting signal, the apparatus comprising:

first monitoring means for monitoring the setting signal to detect a change thereof;

first controlling means for controlling the amount of power supplied to the conditioning device as long as the first monitoring means fails to detect the change of the setting signal, the first controlling means controlling then the amount of power to maintain the actual value of the predetermined physical parameter within a range of desired values determined by the setting signal; and second controlling means for controlling the amount of power supplied to the conditioning device when the first monitoring means detects a changed setting signal, the second controlling means comprising:

first estimating means means for estimating a time period and a uniform amount of power required by the conditioning device to cause the actual value of the predetermined physical parameter to theoretically reach a new range of desired values corresponding to the changed setting signal;

second estimating means for estimating time-related upper and lower limit profiles HLV(t) and LLV(t) of the predetermined physical parameter for the time period estimated by the first estimating means, the upper and lower limit profiles HLV(t) and LLV(t) having respectively different starting values and converging toward the new range of desired values at an end of the time period, the actual value of the predetermined physical parameter being included in a range delimited by the starting values;

supplying means for supplying the uniform amount of power determined by the first estimating means to the conditioning device;

second monitoring means for monitoring the actual value of the predetermined physical parameter during the time period in view of the upper and lower limit profiles HLV(t) and LLV(t) to detect when the actual value of the predetermined physical parameter reaches one of the limit profiles HLV(t) and LLV(t);

third controlling means for controlling the amount of power supplied to the conditioning device when the actual value of the predetermined physical parameter reaches one of the limit profiles HLV(t) and LLV(t), to cause the actual value of the predetermined physical parameter to follow substantially the limit profile HLV(t) or LLV(t) that has been reached for a remaining portion of the time period; and third monitoring means for monitoring time from a beginning of the time period and, when the time period ends, returning the control of the amount of power supplied to the conditioning device to the first controlling means.

11. The apparatus according to claim 10, further comprising a third estimating means for estimating a power command error of the uniform amount of power estimated by the first estimating means by integrating, over the remaining portion of the time period, a difference between the amount of power supplied to the conditioning device during said remaining portion of the time period and the uniform amount of power estimated by the first estimating means so that when a next changed setting signal is detected, the first estimating means takes into account the power command error.

12. The apparatus according to claim 11, wherein:

the range of desired values is limited to a single desired value;

the conditioning device is a heating device, the amount of power supplied to the conditioning device being limited to a maximum power amount; and the first estimating means for estimating the uniform amount of power comprises:

calculating means for calculating a value A where A=(the single desired value−the actual value);

measuring means for measuring an actual amount of power supplied to the heating device;

calculating means for calculating a first percentage of the maximum power amount that represents the actual amount; and calculating means for calculating a second percentage of the maximum power amount where the second percentage=(the first percentage+(A*the power command error)), the uniform amount of power being determined as the second percentage of the maximum power;

the second estimating means for estimating the time-related upper and lower limit profiles HLV(t) and LLV(t) comprises:

determining means for determining whether the value A is positive or negative;

establishing means for establishing the lower limit profile LLV(t) by means of the following equation: LLV(t)=the single desired value−((the time period−Δt)*(A+a predetermined tolerance margin)/the time period) if the value A is positive which means that the actual value of the predetermined physical parameter has to be raised, Δt representing time elapsed since the beginning of the time period; and establishing means for establishing the upper limit profile HLV(t) by means of the following equation: HLV(t)=the single desired value if the value A is positive which means that the actual value of the predetermined physical parameter has to be raised;

establishing means for establishing the upper limit profile HLV(t) by means of the following equation:

HLV(t)=the single desired value−((the time period−Δt)*(A−a predetermined tolerance margin)/the time period) if the value A is negative which means that the actual value of the predetermined physical parameter has to be lowered; and establishing means for establishing the lower limit profile LLV(t) by means of the following equation: LLV(t)=the single desired value if the value A is negative which means that the actual value of the predetermined physical parameter has to be lowered.

13. The apparatus according to claim 12, wherein:

the physical parameter is temperature;

the conditioning device is a heating device; and the first estimating means sets the time period in relation to a predetermined fixed time period.

14. The apparatus according to claim 12, wherein:

the physical parameter is temperature;

the conditioning device is a heating device; and the amount of power supplied to the conditioning device is limited to a maximum amount of power; and the first estimating means sets the time period in relation to a predetermined initialization value when a first changed setting signal is detected, and comprises the following means for upgrading the time period for each subsequent changed setting signal that is detected:

calculating means for calculating the following equation:

the time period=a precedent time period+a gain*(a previous amount of power determined in step (i)−a predetermined fraction of the maximum power amount), where the gain and the predetermined fraction are fixed values determined by previous experimentations; and comparing means for comparing the time period with a range of acceptable time periods, if the time period is within the range of acceptable time periods then the time period is used, otherwise the time period is set to a closest value within the range of acceptable time periods.

15. The apparatus according to claim 10, wherein the first estimating means sets the time period in relation to a predetermined fixed time period.

16. The apparatus according to claim 10, wherein:

the amount of power supplied to the conditioning device is limited to a maximum amount of power; and the first estimating means sets the time period in relation to a predetermined initialization value when a first changed setting signal is detected, and comprises the following means for upgrading the time period for each subsequent changed setting signal that is detected:

calculating means for calculating the following equation:

the time period=a precedent time period+a gain*(a previous amount of power determined in step (i)−a predetermined fraction of the maximum power amount), where the gain and the predetermined fraction are fixed values determined by previous experimentations; and comparing means for comparing the time period with a range of acceptable time periods, if the time period is within the range of acceptable time periods then the time period is used, otherwise the time period is set to a closest value within the range of acceptable time periods.

17. The apparatus according to claim 10, wherein the physical parameter is temperature, and the conditioning device is a heating device.

18. The apparatus according to claim 10, comprising deferring means for deferring operation of the supplying means, the second monitoring means, the third controlling means and the third monitoring means at a time T1 to obtain the new range of desired values at a predetermined time T2, T1 being equal to T2 minus the time period, the first controlling means being in operation as long as the operations of the supplying means, the second monitoring means, the third controlling means and the third monitoring means are deferred.

* * * * *